United States Patent
Schumacher et al.

(10) Patent No.: US 11,554,638 B2
(45) Date of Patent: Jan. 17, 2023

(54) METHODS AND SYSTEMS FOR PRESERVING AUTONOMOUS OPERATION OF A TRANSPORT CLIMATE CONTROL SYSTEM

(71) Applicant: THERMO KING LLC, Minneapolis, MN (US)

(72) Inventors: Ryan Wayne Schumacher, Bloomington, MN (US); Matthew Srnec, Minnetonka, MN (US); Michael James Vanous, Minneapolis, MN (US); Mark D. Leasure, Eagan, MN (US); Wallace Stephen Hubbard, Chanhassen, MN (US); Adam B. Carey, Minneapolis, MN (US)

(73) Assignee: THERMO KING LLC, Minneapolis, MN (US)

( * ) Notice: Subject to any disclaimer, the term of this patent is extended or adjusted under 35 U.S.C. 154(b) by 586 days.

(21) Appl. No.: 16/235,865

(22) Filed: Dec. 28, 2018

(65) Prior Publication Data
US 2020/0207184 A1    Jul. 2, 2020

(51) Int. Cl.
*B60H 1/32* (2006.01)
*B60P 3/20* (2006.01)

(52) U.S. Cl.
CPC ......... *B60H 1/3205* (2013.01); *B60H 1/3232* (2013.01); *B60P 3/20* (2013.01)

(58) Field of Classification Search
CPC ... B60H 1/32; B60H 1/00; B60H 1/22; B60H 1/14; B60P 3/20; B60K 25/00;
(Continued)

(56) References Cited

U.S. PATENT DOCUMENTS

| 3,875,483 A | 4/1975 | Farr |
| 5,104,037 A | 4/1992 | Karg et al. |

(Continued)

FOREIGN PATENT DOCUMENTS

| CN | 2456117 | 10/2001 |
| CN | 1885660 | 12/2006 |

(Continued)

OTHER PUBLICATIONS

Yang et al., "The Role of Thermal Plume in Person-to-Person Contaminant Cross Transmission", 2017 Winter Conference, Seminar 36; Modeling and Control of the Personal Microenvironment, 5 pages.

(Continued)

*Primary Examiner* — Jess Whittington
*Assistant Examiner* — Terry C Buse
(74) *Attorney, Agent, or Firm* — Hamre, Schumann, Mueller & Larson, P.C.

(57) ABSTRACT

A method for preserving autonomous operation of a transport climate control system is provided. The method includes the controller determining whether a regulatory compliance at a current location is restricting and/or preventing the use of a prime mover for powering the transport climate control system while a transport unit is in transit. When the controller determines that use of the prime mover is not being restricted or prevented because of a regulatory compliance, the method includes operating the transport climate control system and the transport power system in an energy harvesting operation mode for storing excess power generated by the prime mover into the auxiliary energy storage. When the controller determines that use of the prime mover is being restricted or prevented because of a regulatory compliance, the method includes the controller (Continued)

instructing the auxiliary energy storage to provide power to the transport climate control system.

17 Claims, 9 Drawing Sheets

(58) Field of Classification Search
CPC .......... B60K 17/28; B60K 6/00; B60K 25/06; B60K 1/00; B60K 6/02; B60K 6/442; B60K 7/00; B60K 6/26; B60K 6/44; G05D 23/00; G05D 1/00; F01N 3/00; B60W 10/04; B60W 20/00; B60W 10/08; B60W 10/06; B60W 20/20; B60W 20/12; B60W 20/13; B60W 20/11; B60W 50/04; G06F 19/00; B60Q 1/30; G08B 5/36; B60L 11/18; B60L 1/00; B60L 1/14; B60L 1/02; B60L 11/12; G06K 9/00; G07C 5/00

See application file for complete search history.

(56) References Cited

U.S. PATENT DOCUMENTS

| | | |
|---|---|---|
| 6,280,320 B1 | 8/2001 | Paschke et al. |
| 6,487,869 B1 | 12/2002 | Sulc et al. |
| 6,518,727 B2 | 2/2003 | Oomura et al. |
| 6,560,980 B2 | 5/2003 | Gustafson et al. |
| 6,600,237 B1 | 7/2003 | Meissner |
| 6,631,080 B2 | 10/2003 | Trimble et al. |
| 6,688,125 B2 | 2/2004 | Okamoto et al. |
| 6,753,692 B2 | 6/2004 | Toyomura et al. |
| 7,011,902 B2 | 3/2006 | Pearson |
| 7,120,539 B2 | 10/2006 | Krull et al. |
| 7,122,923 B2 | 10/2006 | Lafontaine et al. |
| 7,151,326 B2 | 12/2006 | Jordan |
| 7,176,658 B2 | 2/2007 | Quazi et al. |
| 7,206,692 B2 | 4/2007 | Beesley et al. |
| 7,327,123 B2 | 2/2008 | Faberman et al. |
| 7,424,343 B2 | 9/2008 | Kates |
| 7,449,798 B2 | 11/2008 | Suzuki et al. |
| 7,532,960 B2 | 5/2009 | Kumar |
| 7,728,546 B2 | 6/2010 | Tanaka et al. |
| 7,730,981 B2 | 6/2010 | McCabe et al. |
| 7,745,953 B2 | 6/2010 | Puccetti et al. |
| 7,806,796 B2 | 10/2010 | Zhu |
| 7,830,117 B2 | 11/2010 | Ambrosio et al. |
| 7,898,111 B1 | 3/2011 | Pistel |
| 7,900,462 B2 | 3/2011 | Hegar et al. |
| 8,020,651 B2 | 9/2011 | Zillmer et al. |
| 8,030,880 B2 | 10/2011 | Alston et al. |
| 8,170,886 B2 | 5/2012 | Luff |
| 8,214,141 B2 | 7/2012 | Froeberg |
| 8,295,950 B1 | 10/2012 | Wordsworth et al. |
| 8,381,540 B2 | 2/2013 | Alston |
| 8,441,228 B2 | 5/2013 | Brabee |
| 8,476,872 B2 | 7/2013 | Truckenbrod et al. |
| 8,487,458 B2 | 7/2013 | Steele et al. |
| 8,541,905 B2 | 9/2013 | Brabee |
| 8,602,141 B2 | 12/2013 | Yee et al. |
| 8,626,367 B2 | 1/2014 | Krueger et al. |
| 8,626,419 B2 | 1/2014 | Mitchell et al. |
| 8,643,216 B2 | 2/2014 | Lallin |
| 8,643,217 B2 | 2/2014 | Gietzold et al. |
| 8,670,225 B2 | 3/2014 | Nunes |
| 8,723,344 B1 | 5/2014 | Dierickx |
| 8,760,115 B2 | 6/2014 | Kinser et al. |
| 8,764,469 B2 | 7/2014 | Lamb |
| 8,818,588 B2 | 8/2014 | Ambrosio et al. |
| 8,862,356 B2 | 10/2014 | Miller |
| 8,924,057 B2 | 12/2014 | Kinser et al. |
| 8,978,798 B2 | 3/2015 | Dalum et al. |
| 9,030,336 B2 | 5/2015 | Doyle |
| 9,061,680 B2 | 6/2015 | Dalum |
| 9,093,788 B2 | 7/2015 | Lamb |
| 9,102,241 B2 | 8/2015 | Brabee |
| 9,147,335 B2 | 9/2015 | Raghunathan et al. |
| 9,199,543 B2 | 12/2015 | Brabee |
| 9,313,616 B2 | 4/2016 | Mitchell et al. |
| 9,436,853 B1 | 9/2016 | Meyers |
| 9,440,507 B2 | 9/2016 | Giovanardi et al. |
| 9,463,681 B2 | 10/2016 | Olaleye et al. |
| 9,464,839 B2 | 10/2016 | Rusignuolo et al. |
| 9,557,100 B2 | 1/2017 | Chopko et al. |
| 9,562,715 B2 | 2/2017 | Kandasamy |
| 9,694,697 B2 | 7/2017 | Brabee |
| 9,738,160 B2 | 8/2017 | Bae et al. |
| 9,758,013 B2 | 9/2017 | Steele |
| 9,783,024 B2 | 10/2017 | Connell et al. |
| 9,784,780 B2 | 10/2017 | Loftus et al. |
| 9,825,549 B2 | 11/2017 | Choi et al. |
| 9,846,086 B1 | 12/2017 | Robinson et al. |
| 9,893,545 B2 | 2/2018 | Bean |
| 9,931,960 B2 | 4/2018 | Tabatowski-Bush et al. |
| 9,975,403 B2 | 5/2018 | Rusignuolo et al. |
| 9,975,446 B2 | 5/2018 | Weber et al. |
| 9,987,906 B2 | 6/2018 | Kennedy |
| 10,000,122 B2 | 6/2018 | Wu et al. |
| 10,148,212 B2 | 12/2018 | Schumacher et al. |
| 10,240,847 B1 | 3/2019 | Thomas, Jr. |
| 2002/0113576 A1 | 8/2002 | Oomura et al. |
| 2003/0043607 A1 | 3/2003 | Vinciarelli et al. |
| 2003/0106332 A1 | 6/2003 | Okamoto et al. |
| 2003/0200017 A1 | 10/2003 | Capps et al. |
| 2005/0057210 A1 | 3/2005 | Ueda et al. |
| 2006/0284601 A1 | 12/2006 | Salasoo et al. |
| 2007/0052241 A1 | 3/2007 | Pacy |
| 2007/0131408 A1 | 6/2007 | Zeigler et al. |
| 2007/0192116 A1 | 8/2007 | Levitt |
| 2008/0023965 A1 | 1/2008 | Cagliari et al. |
| 2009/0121798 A1 | 5/2009 | Levinson |
| 2009/0126901 A1 | 5/2009 | Hegar et al. |
| 2009/0178424 A1 | 7/2009 | Hwang et al. |
| 2009/0229288 A1 | 9/2009 | Mston et al. |
| 2009/0314019 A1 | 12/2009 | Fujimoto et al. |
| 2009/0320515 A1 | 12/2009 | Bischofberger et al. |
| 2010/0230224 A1 | 9/2010 | Hindman |
| 2010/0312425 A1 | 12/2010 | Obayashi et al. |
| 2010/0320018 A1 | 12/2010 | Gwozdek et al. |
| 2011/0000244 A1 | 1/2011 | Reason et al. |
| 2011/0114398 A1 | 5/2011 | Bianco |
| 2011/0224841 A1 | 9/2011 | Profitt-Brown et al. |
| 2011/0241420 A1 | 10/2011 | Hering et al. |
| 2012/0000212 A1 | 1/2012 | Sanders et al. |
| 2012/0116931 A1 | 5/2012 | Meyers |
| 2012/0198866 A1 | 8/2012 | Zeidner |
| 2013/0000342 A1 | 1/2013 | Blasko et al. |
| 2013/0088900 A1 | 4/2013 | Park |
| 2013/0158828 A1 | 6/2013 | Mcalister |
| 2013/0231808 A1* | 9/2013 | Flath ................ B60W 20/10 903/903 |
| 2014/0026599 A1 | 1/2014 | Rusignuolo et al. |
| 2014/0060097 A1 | 3/2014 | Perreault |
| 2014/0170010 A1* | 6/2014 | Kwak .................. F04C 2/44 418/83 |
| 2014/0203760 A1* | 7/2014 | Lammers ............ B60W 20/00 320/162 |
| 2014/0265560 A1 | 9/2014 | Leehey et al. |
| 2015/0081212 A1 | 3/2015 | Mitchell et al. |
| 2015/0188360 A1 | 7/2015 | Doane et al. |
| 2015/0231948 A1 | 8/2015 | Kennedy |
| 2015/0246593 A1 | 9/2015 | Larson et al. |
| 2015/0330321 A1* | 11/2015 | Lucht .................. F02D 29/06 701/104 |
| 2015/0338858 A1* | 11/2015 | Bates .................. G05D 23/00 62/157 |
| 2015/0355288 A1 | 12/2015 | Yokoyama et al. |
| 2015/0360568 A1 | 12/2015 | Champagne et al. |
| 2016/0011001 A1 | 1/2016 | Emory et al. |
| 2016/0035152 A1 | 2/2016 | Kargupta |
| 2016/0280040 A1 | 9/2016 | Connell et al. |
| 2016/0285416 A1 | 9/2016 | Tiwari et al. |
| 2017/0030728 A1 | 2/2017 | Baglino et al. |
| 2017/0057323 A1 | 3/2017 | Neu et al. |

(56) References Cited

U.S. PATENT DOCUMENTS

| | | | |
|---|---|---|---|
| 2017/0063248 A1 | 3/2017 | Lee et al. | |
| 2017/0098954 A1 | 4/2017 | Ferguson et al. | |
| 2017/0129473 A1* | 5/2017 | Zhang | B60W 20/11 |
| 2017/0190263 A1* | 7/2017 | Enzinger | H01M 10/4264 |
| 2017/0210194 A1* | 7/2017 | Ling | B60P 3/20 |
| 2017/0217280 A1 | 8/2017 | Larson et al. | |
| 2017/0259764 A1 | 9/2017 | Da Silva Carvalho et al. | |
| 2017/0302200 A1 | 10/2017 | Marcinkiewicz | |
| 2017/0349078 A1 | 12/2017 | Dziuba et al. | |
| 2018/0029436 A1 | 2/2018 | Zaeri et al. | |
| 2018/0029488 A1 | 2/2018 | Sjodin | |
| 2018/0111441 A1 | 4/2018 | Menard et al. | |
| 2018/0154723 A1 | 6/2018 | Anderson et al. | |
| 2018/0170349 A1* | 6/2018 | Jobson | B60L 7/18 |
| 2018/0170398 A1 | 6/2018 | Miller et al. | |
| 2018/0201092 A1 | 7/2018 | Ahhuja et al. | |
| 2018/0203443 A1 | 7/2018 | Newman | |
| 2018/0222278 A1 | 8/2018 | Mizuma | |
| 2018/0342876 A1 | 11/2018 | Agnew et al. | |
| 2018/0342877 A1 | 11/2018 | Yoo et al. | |
| 2018/0356870 A1 | 12/2018 | Rusignuolo | |
| 2019/0092122 A1 | 3/2019 | Vanous et al. | |
| 2019/0184838 A1 | 6/2019 | Lee et al. | |
| 2019/0255914 A1 | 8/2019 | Ikeda et al. | |
| 2019/0283541 A1 | 9/2019 | Adetola et al. | |
| 2020/0086712 A1 | 3/2020 | Schumacher et al. | |
| 2020/0086744 A1 | 3/2020 | Schumacher et al. | |
| 2020/0101818 A1 | 4/2020 | Holmstrom et al. | |
| 2020/0101820 A1 | 4/2020 | Wenger et al. | |
| 2020/0189361 A1* | 6/2020 | Radcliff | B60H 1/00771 |

FOREIGN PATENT DOCUMENTS

| | | |
|---|---|---|
| CN | 2912069 | 6/2007 |
| CN | 101713577 | 5/2010 |
| CN | 202038315 | 11/2011 |
| CN | 104539184 | 4/2015 |
| CN | 104734178 | 6/2015 |
| CN | 105711376 | 6/2016 |
| CN | 106184252 | 12/2016 |
| CN | 106766419 | 5/2017 |
| CN | 106774131 | 5/2017 |
| CN | 108074466 | 5/2018 |
| CN | 108931006 | 12/2018 |
| CN | 208306320 | 1/2019 |
| CN | 208650989 | 3/2019 |
| DE | 3817365 | 11/1989 |
| DE | 29715576 | 12/1997 |
| DE | 10138750 | 2/2003 |
| DE | 10200637 | 10/2003 |
| DE | 102011050719 | 12/2012 |
| EP | 0282051 | 9/1988 |
| EP | 1935712 | 6/2008 |
| EP | 2365915 | 9/2011 |
| EP | 2689944 | 1/2014 |
| EP | 2717016 | 9/2014 |
| EP | 3343728 | 7/2018 |
| EP | 3536552 | 9/2019 |
| EP | 3540340 | 9/2019 |
| GB | 2551999 | 1/2018 |
| JP | 2000-158930 | 6/2000 |
| JP | 2007-320352 | 12/2007 |
| JP | 2009-243780 | 10/2009 |
| JP | 2019-145521 | 8/2019 |
| KR | 10-2012-0092834 | 8/2012 |
| WO | 03038988 | 5/2003 |
| WO | 2011066468 | 6/2011 |
| WO | 2012138497 | 10/2012 |
| WO | 2013096084 | 6/2013 |
| WO | 2014002244 | 1/2014 |
| WO | 2014058610 | 4/2014 |
| WO | 2014085672 | 6/2014 |
| WO | 2014106060 | 7/2014 |
| WO | 2014106068 | 7/2014 |
| WO | 2016145107 | 9/2016 |
| WO | 2017058660 | 4/2017 |
| WO | 2017172484 | 10/2017 |
| WO | 2017172855 | 10/2017 |
| WO | 2017176682 | 10/2017 |
| WO | 2017176725 | 10/2017 |
| WO | 2017176729 | 10/2017 |
| WO | 2017189485 | 11/2017 |
| WO | 2017218909 | 12/2017 |
| WO | 2017218910 | 12/2017 |
| WO | 2017218912 | 12/2017 |
| WO | 2018005957 | 1/2018 |
| WO | 2018009646 | 1/2018 |
| WO | 2018009798 | 1/2018 |
| WO | 2018017818 | 1/2018 |
| WO | 2018029502 | 2/2018 |
| WO | 2018204591 | 11/2018 |
| WO | 2018226389 | 12/2018 |
| WO | 2018226649 | 12/2018 |
| WO | 2018226848 | 12/2018 |
| WO | 2018226857 | 12/2018 |
| WO | 2018226862 | 12/2018 |
| WO | 2018226906 | 12/2018 |
| WO | 2018226981 | 12/2018 |
| WO | 2018226986 | 12/2018 |
| WO | 2019051086 | 3/2019 |
| WO | 2019151947 | 8/2019 |
| WO | 2020068446 | 4/2020 |
| WO | 2020068450 | 4/2020 |
| WO | 2020068469 | 4/2020 |
| WO | 2020068475 | 4/2020 |
| WO | 2020068502 | 4/2020 |
| WO | 2020068556 | 4/2020 |
| WO | 2020068641 | 4/2020 |
| WO | 2020068646 | 4/2020 |
| WO | 2020069107 | 4/2020 |

OTHER PUBLICATIONS

"Lamberet Smart Reefer on Solutrans", ZOEKEN, Jul. 28, 2015, 7 pages, available at: https://iepieleaks.nl/lamberet-smart-reefer-solutrans/.

U.S. Appl. No. 16/178,067, titled "Methods and Systems for Generation and Utilization of Supplemental Stored Energy for Use in Transport Climate Control", filed Nov. 1, 2018, 35 pages.

U.S. Appl. No. 16/565,063, titled "System and Method for Managing Power and Efficiently Sourcing a Variable Voltage for a Transport Climate Control System", filed Sep. 9, 2019, 59 pages.

U.S. Appl. No. 16/574,754, titled "Methods and Systems for Energy Management of a Transport Climate Control System", filed Sep. 18, 2019, 50 pages.

U.S. Appl. No. 16/574,775, titled "Methods and Systems for Power and Load Management of a Transport Climate Control System", filed Sep. 18, 2019, 68 pages.

European Patent Application No. 18382672.6, titled "Methods and Systems for Energy Management of a Transport Climate Control System", filed Sep. 19, 2018, 50 pages.

European Patent Application No. 18382673.4 titled "Methods and Systems for Power and Load Management of a Transport Climate Control System", filed Sep. 19, 2018, 68 pages.

U.S. Appl. No. 16/176,802, titled "Methods and Systems for Controlling a Mild Hybrid System That Powers a Transport Climate Control System", filed Oct. 31, 2018, 31 pages.

U.S. Appl. No. 16/176,720, titled "Methods and Systems for Augmenting a Vehicle Powered Transport Climate Control System", filed Oct. 31, 2018, 33 pages.

U.S. Appl. No. 16/176,667, titled "Drive Off Protection System and Method for Preventing Drive Off", filed Oct. 31, 2018, 41 pages.

U.S. Appl. No. 16/176,602, titled "Reconfigurable Utility Power Input With Passive Voltage Booster", filed Oct. 31, 2018, 39 pages.

U.S. Appl. No. 16/147,704, titled "Methods and Systems for Monitoring and Displaying Energy Use and Energy Cost of a Transport Vehicle Climate Control System or a Fleet of Transport Vehicle Climate Control Systems", filed Sep. 29, 2018, 33 pages.

U.S. Appl. No. 16/147,708, titled "Methods and Systems for Autonomous Climate Control Optimization of a Transport Vehicle", filed Sep. 29, 2018, 41 pages.

(56) References Cited

OTHER PUBLICATIONS

PCT International Application No. PCT/US2018/068136, titled "Methods and Systems for Providing Predictive Energy Consumption Feedback for Powering a Transport Climate Control System", filed Dec. 31, 2018, 34 pages.
PCT International Application No. PCT/US2018/068129, titled "Methods and Systems for Notifying and Mitigating a Suboptimal Event Occurring in a Transport Climate Control System", filed Dec. 31, 2018, 44 pages.
PCT International Application No. PCT/US2018/068139, titled "Methods and Systems for Providing Feedback for a Transport Climate Control System", filed Dec. 31, 2018, 37 pages.
PCT International Application No. PCT/US2018/068142, titled "Methods and Systems for Providing Predictive Energy Consumption Feedback for Powering a Transport Climate Control System Using External Data", filed Dec. 31, 2018, 39 pages.
U.S. Appl. No. 16/236,938, titled "Systems and Methods for Smart Load Shedding of a Transport Vehicle While in Transit", filed Dec. 31, 2018, 39 pages.
U.S. Appl. No. 16/565,110, titled "Transport Climate Control System With a Self-Configuring Matrix Power Converter", filed Sep. 9, 2019, 52 pages.
U.S. Appl. No. 16/565,146, titled "Optimized Power Management for a Transport Climate Control Energy Source", filed Sep. 9, 2019, 53 pages.
US Provisional U.S. Appl. No. 62/897,833, titled "Optimized Power Distribution to Transport Climate Control Systems Amongst One or More Electric Supply Equipment Stations", filed Sep. 9, 2019, 41 pages.
European Patent Application No. 19382776.3, titled "MPrioritized Power Delivery for Facilitating Transport Climate Control", filed Sep. 9, 2019, 41 pages.
U.S. Appl. No. 16/565,205, titled "Transport Climate Control System With an Accessory Power Distribution Unit for Managing Transport Climate Control Loads", filed Sep. 9, 2019, 54 pages.
U.S. Appl. No. 16/565,235, titled "Interface System for Connecting a Vehicle and a Transport Climate Control System", filed Sep. 9, 2019, 64 pages.
U.S. Appl. No. 16/565,252, titled "Demand-Side Power Distribution Management For a Lurality of Transport Climate Control Systems", filed Sep. 9, 2019, 44 pages.
U.S. Appl. No. 16/565,282, titled "Optimized Power Cord for Transferring Power to a Transport Climate Control System", filed Sep. 9, 2019, 43 pages.
Extended European Search report, issued in the corresponding European patent application No. 19219060.1, dated May 13, 2020, 7 pages.

* cited by examiner

METHODS AND SYSTEMS FOR PRESERVING AUTONOMOUS OPERATION OF A TRANSPORT CLIMATE CONTROL SYSTEM

FIELD

This disclosure relates generally to energy management of a transport climate control system. More specifically, the disclosure relates to methods and systems for preserving autonomous operation of a transport climate control system.

BACKGROUND

A transport climate control system can include, for example, a transport refrigeration system (TRS) and/or a heating, ventilation and air conditioning (HVAC) system. A TRS is generally used to control an environmental condition (e.g., temperature, humidity, air quality, and the like) within a cargo space of a transport unit (e.g., a truck, a container (such as a container on a flat car, an intermodal container, etc.), a box car, a semi-tractor, a bus, or other similar transport unit). The TRS can maintain environmental condition(s) of the cargo space to maintain cargo (e.g., produce, frozen foods, pharmaceuticals, etc.) In some embodiments, the transport unit can include a HVAC system to control a climate within a passenger space of the vehicle.

SUMMARY

This disclosure relates generally to energy management of a transport climate control system. More specifically, the disclosure relates to methods and systems for preserving autonomous operation of a transport climate control system.

The embodiments provided herein can control operation of the transport climate control system amongst a plurality of operation modes working in parallel in order to preserve autonomous operation of a transport climate control system. That is, the embodiments described herein can operate multiple operation modes of the transport climate control system to preserve autonomous operation of the transport climate control system while in transit. Accordingly, during transit operation of the transport climate control system can be maintained without requiring a connection to a utility power source.

Also, the embodiments described herein can provide efficient power management from multiple power sources powering the transport climate control system. In particular, the embodiments described herein can provide energy harvesting and energy conservation. The energy harvesting can be used to supplement and/or improve operation of the transport climate control system as well as to meet any regulations (noise emissions, fuel consumption regulations (e.g., brake-specific fuel consumption, diesel exhaust fluid, etc.), particulate regulations (e.g., particulate matter emissions, particulate number emissions, diesel particulate emissions, etc.), gaseous emissions (e.g., nitrogen oxide emissions, carbon dioxide emissions, hydro carbon emissions, etc.), etc.) where the transport climate control system is located. It will be appreciated that the embodiments described herein can harvest energy from power sources that may not be under direct control of the transport climate control system, may not available all the time, or may only be able to supply a finite amount of energy. Accordingly, the embodiments described herein can avoid having to power the transport climate control system during a transit trip by connecting to a utility power source.

In some embodiments, the modes of operation can include a regulatory compliance operation mode, a temperature control operation mode, a load loss prevention override operation mode, a user feedback operation mode, a prime mover speed optimizer operation mode, a prime mover load optimizer operation mode, a compressor coefficient of performance (COP) optimization operation mode, an auxiliary energy storage maintenance operation mode, and an energy harvesting operation mode.

In one embodiment, a method for preserving autonomous operation of a transport climate control system is provided. The transport climate control system includes a refrigeration circuit having a compressor. The refrigeration circuit provides climate control within an internal space of a transport unit using a transport power system that includes a controller, a prime mover, and an auxiliary energy storage. The method includes the controller determining whether a regulatory compliance at a current location is restricting and/or preventing the use of the prime mover for powering the transport climate control system while the transport unit is in transit. When the controller determines that use of the prime mover for powering the transport climate control system is not being restricted or prevented because of a regulatory compliance, the method includes operating the transport climate control system and the transport power system in an energy harvesting operation mode for storing excess power generated by the prime mover into the auxiliary energy storage. When the controller determines that use of the prime mover for powering the transport climate control system is being restricted or prevented because of a regulatory compliance, the method includes the controller instructing the auxiliary energy storage to provide power to the transport climate control system.

In another embodiment, a transport power system is provided. The transport power system includes a controller, a prime mover, and an auxiliary energy storage. The controller controls operation of the transport power system and a transport climate control system. The transport climate control system has a refrigeration circuit that provides climate control within an internal space of a transport unit. The refrigeration circuit includes a compressor. The prime mover provides power to the transport climate control system. The auxiliary energy storage provides power to the transport climate control system. The controller determines whether a regulatory compliance at a current location is restricting and/or preventing the use of the prime mover for powering the transport climate control system while the transport unit is in transit. When the controller determines that use of the prime mover for powering the transport climate control system is not being restricted or prevented because of a regulatory compliance, the controller instructs the transport climate control system and the transport power system to operate in an energy harvesting operation mode for storing excess power generated by the prime mover into the auxiliary energy storage. When the controller determines that use of the prime mover for powering the transport climate control system is being restricted or prevented because of a regulatory compliance, the controller instructs the auxiliary energy storage to provide power to the transport climate control system.

BRIEF DESCRIPTION OF THE DRAWINGS

References are made to the accompanying drawings that form a part of this disclosure and which illustrate embodiments in which the systems and methods described in this specification can be practiced.

Like reference numbers represent like parts throughout.

DETAILED DESCRIPTION

This disclosure relates generally to energy sources and loads management. More specifically, the disclosure relates to methods and systems for preserving autonomous operation of a transport climate control system.

The embodiments provided herein can control operation of the transport climate control system amongst a plurality of operation modes working in parallel in order to preserve autonomous operation of a transport climate control system. That is, the embodiments described herein can operate multiple operation modes of the transport climate control system to preserve autonomous operation of the transport climate control system while in transit. Accordingly, during transit operation of the transport climate control system can be maintained without requiring a connection to a utility power source.

Also, the embodiments described herein can provide efficient power management from multiple power sources powering the transport climate control system. In particular, the embodiments described herein can provide energy harvesting and energy conservation. The energy harvesting can be used to supplement and/or improve operation of the transport climate control system as well as to meet any regulations (noise emissions, fuel consumption regulations (e.g., brake-specific fuel consumption, diesel exhaust fluid, etc.), particulate regulations (e.g., particulate matter emissions, particulate number emissions, diesel particulate emissions, etc.), gaseous emissions (e.g., nitrogen oxide emissions, carbon dioxide emissions, hydro carbon emissions, etc.), etc.) where the transport climate control system is located. It will be appreciated that the embodiments described herein can harvest energy from power sources that may not be under direct control of the transport climate control system, may not available all the time, or may only be able to supply a finite amount of energy. Accordingly, the embodiments described herein can avoid having to power the transport climate control system during a transit trip by connecting to a utility power source.

The embodiments described herein can be provided in, for example, a transport climate control system such as a TRS or MTRS for a transport unit (TU), an HVAC system for a vehicle, etc.

As defined herein, "low voltage" refers Class A of the ISO 6469-3 in the automotive environment. In particular, a maximum working voltage of between 0V and 60V DC or between 0V and 30V AC.

As defined herein, "high voltage" refers Class B of the ISO 6469-3 in the automotive environment. In particular, a maximum working voltage of between 60V and 1500V DC or between 30V and 1000V AC.

Figure 1A:
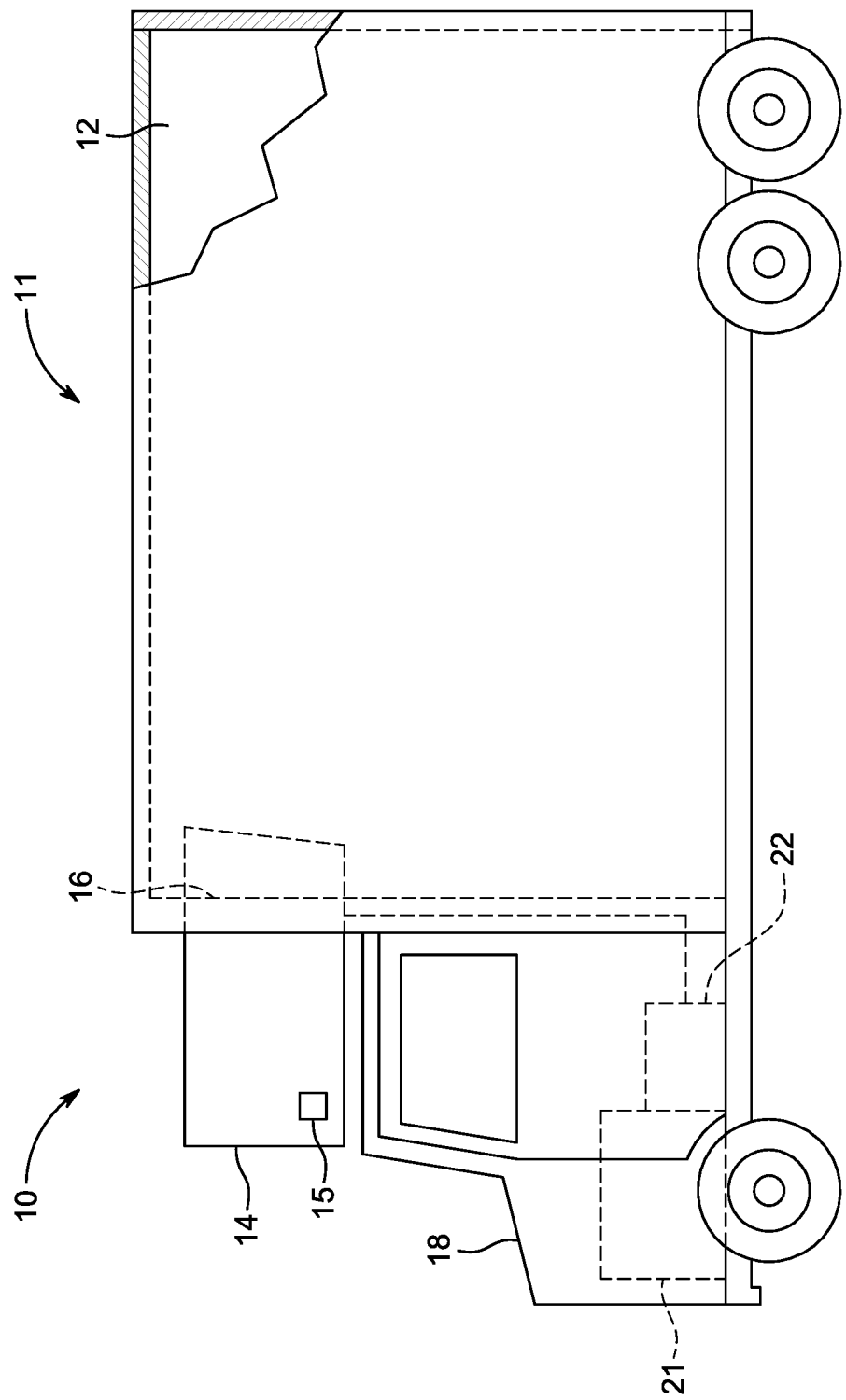
FIG. 1A illustrates a side view of a truck with a front wall mounted vehicle powered transport refrigeration unit, according to one embodiment.

FIG. 1A depicts a temperature-controlled straight truck 11 that includes a conditioned load space 12 for carrying cargo and a transport climate control system 10. The transport climate control system is a TRS 10 that includes a transport refrigeration unit (TRU) 14 that is mounted to a front wall 16 of the load space 12. The TRU 14 is controlled via a TRS controller 15 to provide temperature control within the load space 12. The TRU 14 can include, amongst other components, a refrigeration circuit that connects, for example, a compressor, a condenser, an evaporator and an expansion valve to provide climate control within the load space 12.

The truck 11 further includes a vehicle power bay 18, which houses a prime mover 21, such as a combustion engine (e.g., diesel engine, etc.), that provides power to move the truck 11 and to operate the TRU 14. In some embodiments, the prime mover 21 can work in combination with an optional machine 22 (e.g., an alternator) to operate the TRU 14. In one embodiment, the TRS 10 (including the TRU 14) can be powered by a transport power system (see FIGS. 2A-D). Also, in some embodiments, the truck 11 can be a hybrid vehicle that is powered by the prime mover 21 in combination with a battery power source or can be an electrically driven truck in which the prime mover 21 is replaced with an electric power source (e.g., a battery power source).

While FIG. 1A illustrates a temperature-controlled straight truck 11, it will be appreciated that the embodiments described herein can also apply to any other type of transport unit including, but not limited to, a container (such as a container on a flat car, an intermodal container, etc.), a box car, or other similar transport unit.

Figure 1B:
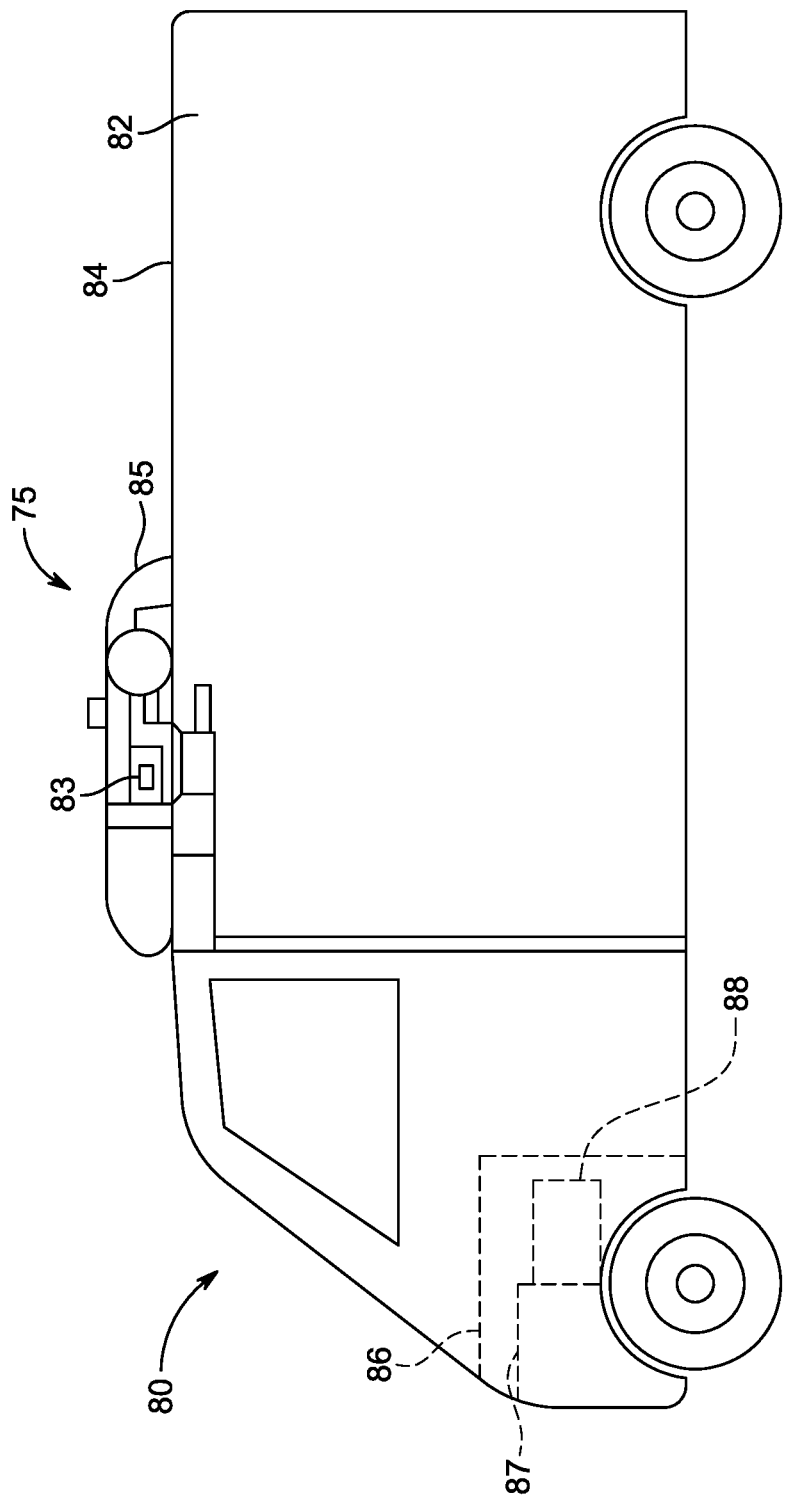
FIG. 1B illustrates a side view of a van with a roof mounted vehicle powered transport refrigeration unit, according to one embodiment.

FIG. 1B depicts a temperature-controlled van 80 that includes a conditioned load space 82 (or internal space) for carrying cargo and a transport climate control system for providing climate control within the conditioned load space 82. The transport climate control system is a TRS 75 that includes a transport refrigeration unit (TRU) 85 that is mounted to a rooftop 84 of the load space 82. The TRU 85 is controlled via a TRS controller 83 to provide temperature control within the load space 82. The TRU 75 can include, amongst other components, a refrigeration circuit that connects, for example, a compressor, a condenser, an evaporator and an expansion valve to provide climate control within the load space 82.

The van 80 further includes a vehicle power bay 86, which houses a prime mover 87, such as a combustion engine (e.g., diesel engine, etc.), that provides power to move the van 80 and to operate the TRU 85. In some embodiments, the prime mover 87 can work in combination with an optional machine 88 (e.g., an alternator) to operate the TRU 85. In one embodiment, the TRU 85 includes a transport power system (see FIGS. 2A-D). Also, in some embodiments, the van 80 can be a hybrid vehicle that is powered by the prime mover 87 in combination with a battery power source or can be an electrically driven truck in which the prime mover 87 is replaced with an electric power source (e.g., a battery power source).

Figure 1C:
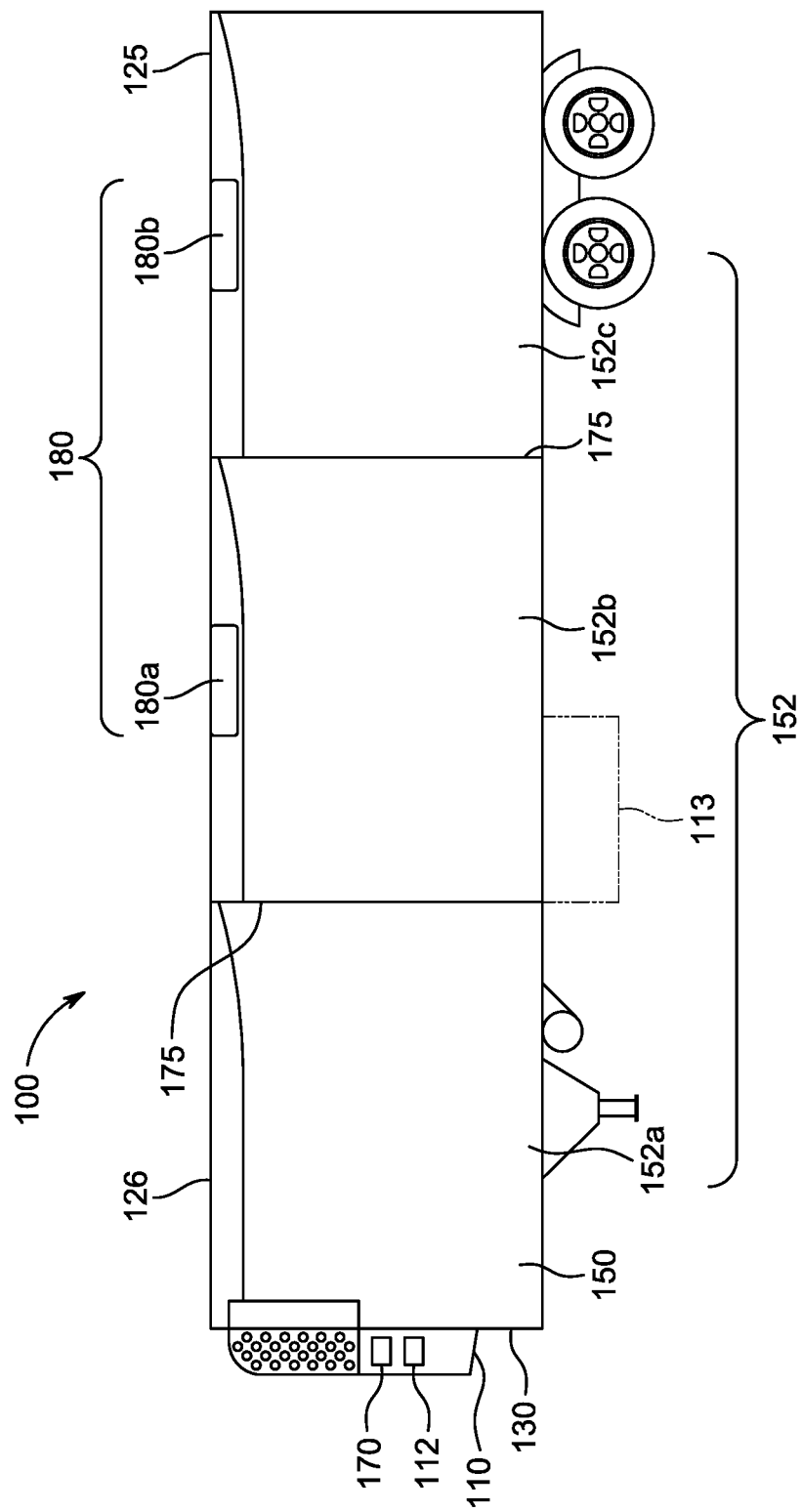
FIG. 1C illustrates a schematic cross sectional side view of a climate controlled transport unit with a multi-temp transport climate control system, according to one embodiment.

FIG. 1C illustrates one embodiment of a transport climate control system that is a multi-zone transport refrigeration system (MTRS) 100 for providing climate control within an internal space 150 of a TU 125. The TU 125 can be towed, for example, by a tractor (not shown). The internal space 150 can be divided into a plurality of zones 152. The term "zone" means a part of an area of the internal space 150 separated by walls 175. It will be appreciated that the embodiments disclosed herein can also be used in a single zone transport climate control system.

The MTRS 100 includes a TRU 110 and a plurality of remote evaporator units 180. The TRU 110 and each of the remote evaporator units 180 provide climate control (e.g. temperature, humidity, air quality, etc.) within a separate zone of the internal space 150. The TRU 110 can include, amongst other components, a refrigeration circuit that connects, for example, a compressor, a condenser, an evaporator and an expansion valve to provide climate control within the at least one of the zones of the internal space 150. Each of the evaporator units 180 can also be connected to the refrigeration circuit to provide climate control to a particular zone 172 of the internal space 150.

The MTRS 100 also includes a MTRS controller 170 and one or more sensors (e.g., Hall effect sensors, current transducers, etc.) (see FIGS. 2A-D) that are configured to measure one or more parameters (e.g., ambient temperature, compressor suction pressure, compressor discharge pressure, supply air temperature, return air temperature, humidity, etc.) of the MTRS 100 and communicate parameter data to the MTRS controller 170. The TRU 110 is disposed on a front wall 130 of the TU 125. In other embodiments, it will be appreciated that the TRU 110 can be disposed, for example, on a rooftop 126 or another wall of the TU 125.

In some embodiments, the MTRS 100 can include an undermount unit 113. In some embodiments, the undermount unit 113 can be a TRU that can also provide environmental control (e.g. temperature, humidity, air quality, etc.) within the internal space 150 of the TU 125. The undermount unit 113 can work in combination with the TRU 110 to provide redundancy or can replace the TRU 110. Also, in some embodiments, the undermount unit 113 can be a power module that includes, for example, a generator that can help power the TRU 110.

The programmable MTRS controller 170 may comprise a single integrated control unit or may comprise a distributed network of transport climate control system control elements. The number of distributed control elements in a given network can depend upon the particular application of the principles described herein. The MTRS controller 170 is configured to control operation of the MTRS 100.

Each of the controllers (the MTRS controller 170) shown in FIGS. 1A-C can control operation of the transport climate control systems (the TRS 10 and 75 and the MTRS 100) and a transport power system (see the transport power system 200 shown in FIG. 2) to operate in one or more of a plurality of operation modes including, for example, a regulatory compliance operation mode, a temperature control operation mode, a load loss prevention override operation mode, a user feedback operation mode, a prime mover speed optimizer operation mode, a prime mover load optimizer operation mode, a compressor coefficient of performance (COP) optimization operation mode, an auxiliary energy storage maintenance operation mode, and an energy harvesting operation mode. The controller can control operation of the transport climate control system and the transport power system amongst the plurality of operation modes in order to preserve autonomous operation of a transport climate control system.

In some embodiments, one or more of these operation modes can be operated in parallel. When operating one or more of these operation modes in parallel, the controller can adjust operation of each of the operation modes based on a priority order amongst the operation modes and a priority weight given to each of the operation modes. For example, in one embodiment, the priority order can include the regulatory compliance operation mode as the highest priority followed by the temperature control operation mode, then the load loss prevention override operation mode, then the user feedback operation mode, then the prime mover load optimizer operation mode, then the prime mover speed optimizer operation mode, then the compressor coefficient of performance (COP) optimization operation mode, then the auxiliary energy storage maintenance operation mode, and lastly the energy harvesting operation mode.

In the regulatory compliance operation mode, the controller is configured to control operation of the transport climate control system and the transport power system to ensure compliance with one or more regulations where the transport unit is currently located. The regulations can include, for example, noise emissions, fuel consumption regulations (e.g., brake-specific fuel consumption, diesel exhaust fluid, etc.), particulate regulations (e.g., particulate matter emissions, particulate number emissions, diesel particulate emissions, etc.), gaseous emissions (e.g., nitrogen oxide emissions, carbon dioxide emissions, hydro carbon emissions, etc.), etc. In some embodiments, this operation mode can lower a prime mover speed to mitigate audible noise when, for example, the transport unit is located in a geographic location with noise regulations, during one or more time periods over the course of a day, etc. In some embodiments, this operation mode can use a counter based algorithm that can prioritize meeting or exceeding one or more regulation requirements. For example, in one embodiment, the controller can limit the total number of hours within a set period of time that the prime mover can be run to meet an emissions requirement. The controller can control operation of the transport climate control system and the transport power system in order to maximize the likelihood that the prime mover is not required to operate longer than the total number of hours within the set period of time.

In the temperature control operation mode, the controller is configured to control the transport climate control system and the transport power system to provide a desired temperature(s) within the internal space of the transport unit.

In the load loss prevention override operation mode, the controller is configured to override operation of the other operation modes to prevent load loss of cargo stored in the internal space of the transport unit. For example, the load loss prevention override operation mode can instruct the controller to bypass operation of one of the other operation modes in order to ensure that the climate within the internal space of the transport unit is maintained to an extent that load loss of the cargo stored in the internal space is prevented.

In the user feedback operation mode, the controller is configured to adjust the priority level of the operation modes based on input from the user (e.g., the customer, the vehicle driver, etc.). In some embodiments, the user can also choose, for example, whether climate control within the internal space of the transport unit or vehicle operation of the vehicle should be prioritized.

In the prime mover load optimizer operation mode, the controller is configured to calculate an optimal load on the prime mover (e.g., the prime mover 21 shown in FIG. 1A, the prime mover 87 shown in FIG. 1B, the prime mover 202 shown in FIGS. 2A-D) at the current prime mover operation speed to maximize efficient use of the power generated by the prime mover. It will be appreciated that efficient use of the power generated by the prime mover can be maximized when the percentage load on the prime mover is about 70%.

In the prime mover speed optimizer operation mode, the controller is configured to calculate an optimal prime mover operation speed of a prime mover (e.g., the prime mover 21 shown in FIG. 1A, the prime mover 87 shown in FIG. 1B, the prime mover 202 shown in FIGS. 2A-D) to maximize performance of the transport climate control system and/or the transport power system. In this mode, the controller can utilize feedback data obtained while operating one or more of the other operation modes to calculate the optimal prime mover operation speed. The feedback data can include, for example, refrigeration demand amount, fuel consumption of the prime mover at a specific operation speed, a compressor COP of a compressor of the transport climate control system, amount of energy storage stored in an auxiliary energy storage of the transport power system, etc. For example, the controller can adjust an operation speed of the prime mover 202 even if the current operation speed of the prime mover 202 is capable of meeting the refrigeration demand amount so that the auxiliary energy storage can gain additional charging. In some embodiments, the controller can continually calculate the optimal prime mover operation speed of the prime mover.

In the COP optimization operation mode, the controller is configured to calculate an optimal prime mover operation speed that can maximize the COP of the compressor of the transport climate control system. In some embodiments, the controller can continually calculate an optimal prime mover operation speed to maximize the COP of the compressor.

In the auxiliary energy storage maintenance operation mode, the controller is configured to determine a charge status of the auxiliary energy storage of the transport power system and can compare the charge status with, for example, vehicle route information to determine where along the route the auxiliary energy storage can be charged, discharged and/or operated in a null state.

In the energy harvesting operation mode, the controller is configured to maximize capture of excess power available from the transport power system in order to preserve autonomous operation of the transport climate control system. The energy harvesting operation mode is discussed in further detail below with respect to FIG. 4. In some embodiments, the energy harvesting operation mode can be triggered whenever the transport climate control system is being powered by the prime mover 202 whether or not the transport climate control system is in transit.

In some embodiments, the MTRS can be powered by a transport power system (See FIGS. 2A-D). Also, in some embodiments, the TU 125 can be towed and powered by a tow vehicle (e.g., tractor). The tow vehicle can be a hybrid vehicle that is powered by a prime mover in combination with a battery power source or can be an electrically driven tow vehicle in which the prime mover is replaced with an electric power source (e.g., a battery power source).

It will be appreciated that in some embodiments, the transport power system for powering the TRS 10 and 75 and the MTRS 100 can be disposed in the TRU 14, 85, 110. In other embodiments, the transport power system can be separate from the TRU 14, 85, 110. Also, in some embodiments, the transport power system can include two or more different power sources disposed within or outside of the TRU 14, 85, 110. In some embodiments, the transport power system can include one or more of a prime mover, a battery storage system, an alternator, a generator (e.g., a vehicle axle generator), a solar panel, a fuel cell, a power take off (PTO) power source (e.g., electric PTO power source), a utility power source, an auxiliary power unit (APU), a non-rotational kinetic power source, etc. Also, the prime mover can be a combustion engine or a microturbine engine and can operate as a two speed prime mover, a variable speed prime mover, etc. The transport power system can provide power to, for example, the TRS controllers 15, 83, the MTRS controller 170, a compressor (not shown), a plurality of DC (Direct Current) components (not shown), a plurality of AC (Alternating Current) components (not shown), etc. The DC components and/or AC components can be accessories or components of the TRS 20, 75 and the MTRS 100 that require DC or AC power to operate. Examples of the DC components can include, for example, DC fan motor(s) for a condenser fan or an evaporator blower (e.g., an Electrically Commutated Motor (ECM), a Brushless DC Motor (BLDC), etc.), a fuel pump, a drain tube heater, solenoid valves (e.g., controller pulsed control valves), etc. Examples of the AC components can include, for example, the compressor, AC fan motor(s) for a condenser fan or an evaporator blower, a fuel pump, a drain tube heater, etc. Details of the transport power system are discussed below with respect to FIGS. 2A-D.

FIGS. 2A-D illustrate block diagram schematics of one embodiment of a transport power system 200 for powering a transport climate control system (e.g., the TRS 10, 75 shown in FIGS. 1A, 1B and the MTRS 100 shown in FIG. 1C). The transport power system 200 can be configured to supply electrical and/or mechanical power to the transport climate control system. The transport power system 200 shown in FIGS. 2A-D is a hybrid power system that can preserve autonomous of the transport climate control system while in transit.

Figure 2A:
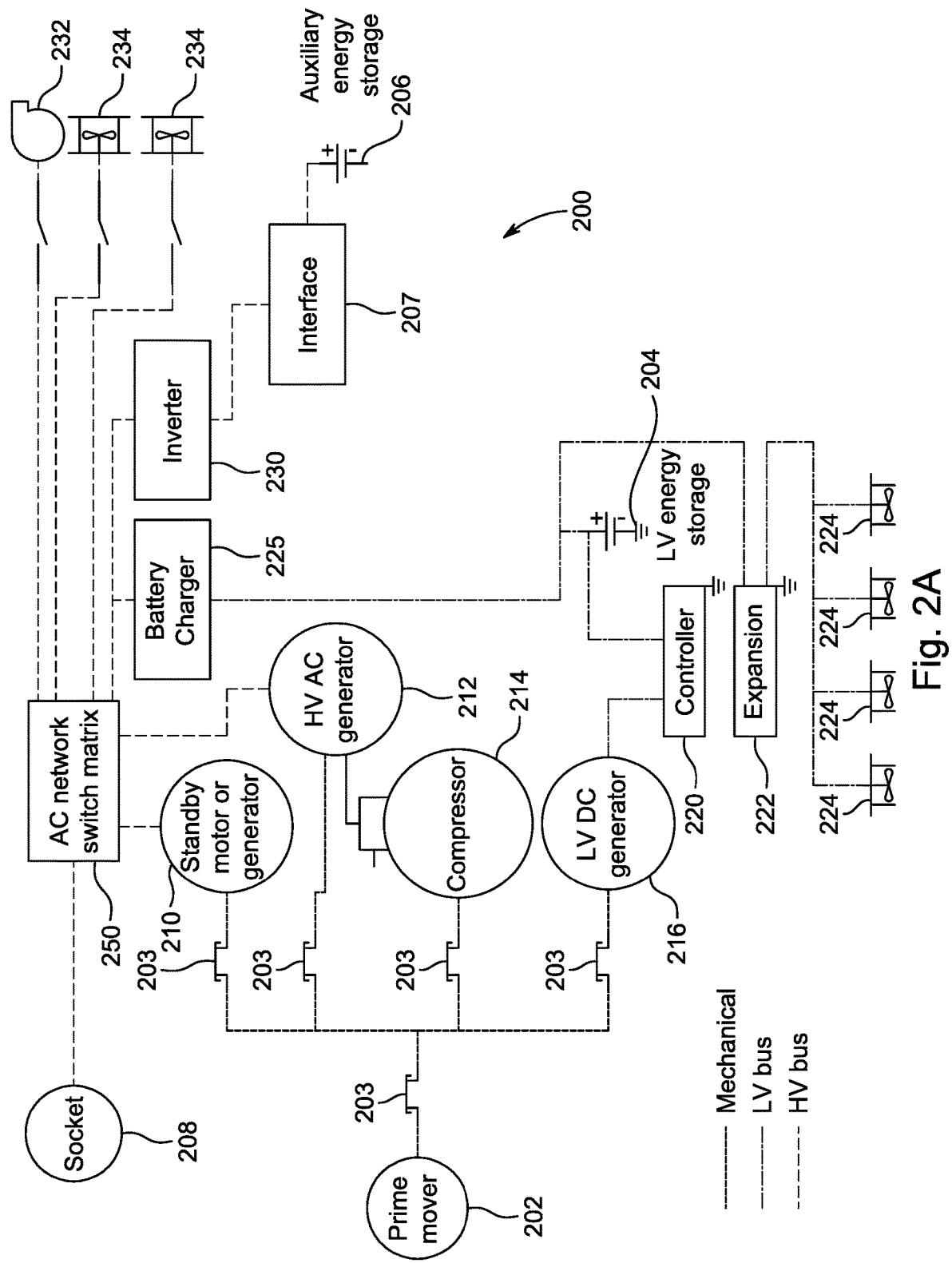
FIGS. 2A-D illustrate block diagram schematics of a transport power system for powering a transport climate control system, according to one embodiment.

As shown in FIG. 2A, the transport power system 200 includes a prime mover 202, a low voltage energy storage 204, an auxiliary energy storage 206 and a utility power socket 208. It will be appreciated that in other embodiments, the transport power system 200 can include other types of power sources including, for example, an electronic power take-off unit, a non-rotational kinetic energy device, etc.

The prime mover 202 is configured to provide mechanical power to a standby motor or generator 210, a high voltage AC generator 212, a compressor 214, and a low voltage DC generator 216. In some embodiments, the transport power system 200 can include a plurality of optional clutches 203 provided between each connection of the prime mover 202 and the standby motor or generator 210, the high voltage AC generator 212, the compressor 214, and the low voltage DC generator 216. The plurality of optional clutches 203 are provided to mechanically couple and decouple connections between the prime mover 202, the standby motor or generator 210, the high voltage AC generator 212, the compressor 214, and the low voltage DC generator 216. The plurality of optional clutches 203 can be controlled by, for example, a controller 220 to determine which of the prime mover 202, the standby motor or generator 210, the HVAC generator 212, the compressor 214, and the low voltage DC generator 216 are mechanically coupled to each other. In some embodiments, the prime mover 202 is an electronically controlled prime mover that includes an engine control unit (ECU) that can communicate with the controller 220.

The prime mover 202 can be an internal combustion engine (e.g., a diesel engine), a microturbine engine, a compressed natural gas (CNG) engine, etc. Also, the prime mover 202 can be a two speed prime mover, a variable speed prime mover, etc. In some embodiments, the prime mover 202 is an electronically controlled prime mover that includes an engine control unit (ECU). In these embodiments, the ECU can be connected to the controller 220 via, for example, a controller area network (CAN) bus and can provide the controller 220 information regarding the operation of the prime mover 202 including, for example, the load demand on the prime mover 202.

The standby motor or generator 210 can, with the assistance of the inverter 230 or a battery charger 225, operate as a generator to convert mechanical power from the prime mover 202 into high voltage AC power (e.g., between 30V and 1000V AC) and direct the high voltage AC power to an AC network switch matrix 250. In some embodiments, the standby motor or generator 210 can provide, for example, ~15-20 kW of power. In some embodiments, when the mechanical power from the prime mover 202 is not available, the standby motor or generator 210 can operate as a motor that is mechanically coupled to the compressor 214 via the optional clutches 203 to provide mechanical power to run the compressor 214. As shown in FIGS. 2A-D, the standby motor or generator 210 is separate from the compressor 214. In some embodiments, the standby motor or generator 210 can be a permanent magnet machine and may not include a generator. In some embodiments, the standby motor or generator 210 can be a vehicle axle generator that transfers mechanical power generated by a vehicle axle into high voltage AC power.

The high voltage AC generator 212 is configured to convert mechanical power from the prime mover 202 into high voltage AC power (e.g., between 3 to 4 kW power with a voltage of between 30V and 1000V AC) and direct the high voltage AC power to the AC network switch matrix 250. In some embodiments, when the mechanical power from the prime mover 202 is not available, high voltage AC generator 212 is mechanically coupled to the compressor 214 to provide mechanical power to drive the compressor 214. As shown in FIGS. 2A-D, the high voltage AC generator 212 is separate from the compressor 214. However, in other embodiments, the high voltage AC generator 212 can be hermetically sealed within and integrated with the compressor 214. In some embodiments, the high voltage AC generator 212 can be an induction machine that may not require an inverter to be started. In some embodiments, the high voltage AC generator 212 can be a vehicle axle generator that transfers mechanical power generated by a vehicle axle into high voltage AC power (and possibly low voltage AC power as well).

The compressor 214 is configured to drive refrigerant through a refrigeration circuit to provide climate control to an internal space of a transport unit. In this embodiment, the compressor 214 can be mechanically driven by the prime mover 202 and/or electrically driven by the standby motor or generator 210 In other embodiments, the compressor 214 can be only an electrically driven compressor with an integral electrical machine hermetically contained therewithin an enclosure. In some embodiments, the compressor 214 can be a two speed compressor. In other embodiments, the compressor 214 can be a variable speed compressor. In some embodiments, the compressor 214 can be driven at multiple speed in order to match a refrigerant mass flow rate demand of the transport power system 200.

The low voltage DC generator 216 is configured to convert mechanical power from the prime mover 202 into a low voltage DC power (e.g., between 0V and 60V DC). In some embodiments, the low voltage DC generator 216 can supply 12 V DC power. The low voltage DC generator 216 is configured to power the controller 220. In some embodiments, the low voltage DC generator 216 can also power one or more low voltage DC components of the transport climate control system (e.g., electronically commuted motor driven evaporator fan(s)).

The low voltage energy storage 204 is configured to provide low voltage DC power (e.g., between 0V and 60V DC) to one or more components of the transport climate control system. In particular, the low voltage energy storage 204 is configured provide low voltage DC power to the controller 220, one or more lights, one or more solenoid valves, one or more accessories (e.g., lift gates, etc.), a telematics unit and an expansion unit 222 powering a plurality of remote evaporator unit fans 224. The expansion unit 222 can be configured to facilitate a mutli-temperature transport climate control system. The low voltage energy storage 204 is also configured to receive power from an AC/DC/DC converter 225. In some embodiments, the low voltage energy storage 204 includes one or more batteries that can be charged, for example, by the AC/DC/DC converter 225. For example, the low voltage energy storage 204 can be a 12V DC battery, a 24V DC battery, a 48V DC battery, a solar power source, etc.

The auxiliary energy storage 206 is configured to store and provide a high voltage DC power (e.g., between 60V and 1500V DC) for one or more components of the transport climate control system. In particular, the auxiliary energy storage 206 is configured to provide high voltage DC power to an inverter 230 via an interface 207. The inverter 230 then converts the high voltage DC power into a high voltage AC power and provides the high voltage AC power to the AC network switch matrix 250. The AC network switch matrix 250 can then provide high voltage AC power to, for example, the compressor 214 as required by the transport climate control system, an evaporator blower 232 and condenser fans 234 of the transport climate control system. In some embodiments, the inverter 230 can provide high voltage DC power to the auxiliary energy storage 206 via the interface 207 to charge the auxiliary energy storage 206. The interface 207 is configured to manage the amount of current into and out of the auxiliary energy storage 206. In particular, the interface 207 is a bi-directional interface and can regulate a voltage in, a current in, a voltage out, a current out, etc. to ensure a proper power flow through the power system 200. In some embodiments, the auxiliary energy storage 206 can be, for example, a high voltage battery storage system, etc.

The AC/DC/DC converter 225 is configured to convert an AC power into DC power or vice versa. In some embodiments, the DC power can be boosted or bucked by the AC/DC/DC converter 225 from a first DC power voltage to a second DC power voltage with the first DC power voltage greater than or less than the second DC power voltage. In some embodiments, the AC/DC/DC converter 225 can provide passive rectification or active rectification. When the AC/DC/DC converter 225 provides active rectification or provides a boost to the DC power voltage, the power factor and reactive power on the transport power system 200 can be affected. Accordingly, AC power inputted into the AC/DC/DC converter 225 can provide an active field excitation of the standby motor or generator 210 effectively making it a generator. In some embodiments, the AC/DC/DC converter 225 can be a battery charger for charging the low voltage energy storage 204.

The inverter 230 can operate as, for example, a motor drive or as an active rectifier. In some embodiments, the inverter 230 can be a bi-directional inverter that can be, for example, an AC source from a DC link (e.g., motor drive) or can be a DC link from AC sources (e.g., an active front end). The inverter 230 can be used in different operation modes of the transport climate control system to control current and voltage of an input power source (e.g., the standby motor or generator 210, the high voltage AC generator 212, the auxiliary energy storage 206, etc.) and an output load (e.g., the evaporator blower 232, the condenser fans 234, the auxiliary energy storage 206, the standby motor or generator 210, etc.). In some embodiments, the inverter 230 can act as an inverter motor drive and covert high voltage DC energy stored in the auxiliary energy storage 206 into high voltage AC energy that can be used to drive the standby motor or generator 210 and thereby the compressor 214. In some embodiments, the inverter can operate as an inverter active rectifier and convert high voltage AC energy from the standby motor or generator 210 or the high voltage AC generator 212 into a regulated high voltage DC energy that can be used to power the evaporator blower 232, the condenser fans 234, or charge the auxiliary energy storage 206.

The utility power socket 208 is configured to connect to a utility power source, for example, to power one or more components of the transport climate control system when the transport climate control system is not in transit. The utility power socket 208 is configured to provide high voltage AC power to the AC network switch matrix 250.

The AC network switch matrix 250 is electrically connected to each of the utility power socked 208, the standby motor or generator 210, the high voltage AC generator 212, the AC/DC/DC converter 225, the inverter 230, the evaporator blower 232 and the condenser fans 234. The AC network switch matrix 250 is configured to receive high voltage AC power from the utility power socket 208, the standby motor or generator 210, the high voltage AC generator 212, and/or the inverter 230 and direct the high voltage AC power to the AD/DC/DC converter 225, the evaporator blower 232, and the condenser fans 234. The AC network switch matrix 250 can be controlled, for example, via the controller 220.

As shown in FIGS. 2A-D, the transport power system 200 includes the prime mover 202, the low voltage energy storage 204, the auxiliary energy storage 206, the utility power socket 208, the standby motor or generator 210, the high voltage AC generator 212 and the low voltage DC generator 216 that can provide power to components of the transport climate control system. It will be appreciated that in other embodiments, a transport power system may not include each of these power sources or may include one or more other power sources. The other power sources can include, for example, an alternator, a solar panel, a fuel cell, a power take off (PTO) power source (e.g., electric PTO power source), an auxiliary power unit (APU), a non-rotational kinetic power source, etc.

The controller 220 is configured to control operation of the transport power system 200. In particular, the controller 220 can control the transport power system 200 to operate in a variety of configurations based on whether power is supplied by the prime mover 202, by a utility power source via the utility power socket 208, or by the auxiliary energy storage 206. In some embodiments, when power is supplied to the transport power system 200 via the prime mover 202, the controller 220 can instruct the compressor 214 to be powered by the prime mover 202, and the evaporator blower 232 and the condenser fans 234 to be powered by the high voltage AC generator 212. In these embodiments, the AD/DC/DC converter 225 can use active rectification to charge the auxiliary energy storage 206 using excess power generated by the prime mover 202 and harvested by the high voltage AC generator 212.

Figure 2B:
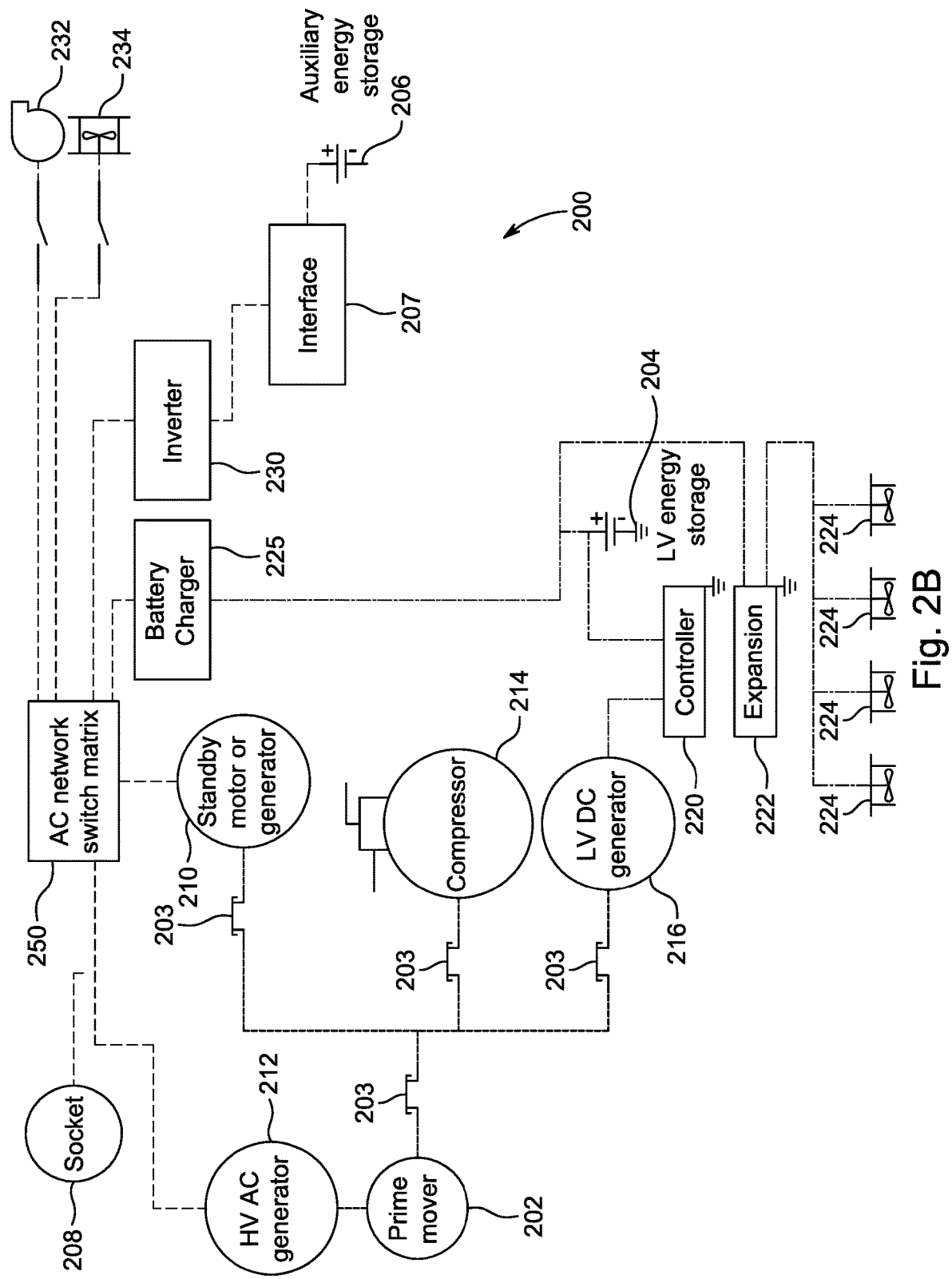

In some embodiments, when power is supplied by the transport power system 200 via the prime mover 202 as shown in FIG. 2B, the controller 220 can instruct the compressor 214 to be powered by the prime mover 202, and the evaporator blower 232 and the condenser fans 234 to be powered by the standby motor or generator 210 acting as a generator. In these embodiments, the AD/DC/DC converter 225 can use active rectification to charge the auxiliary energy storage 206 using excess power generated by the prime mover 202 and harvested by the standby motor or generator 210. As shown in FIG. 2B, the prime mover 202 can also drive the high voltage AC generator 212 which can provide high voltage AC power to the AC network switch matrix 250. Also, the utility power socket 208 can be disconnected from a utility power source such that the utility power socket 208 does not provide power to the AC network switch matrix 250.

Figure 2C:
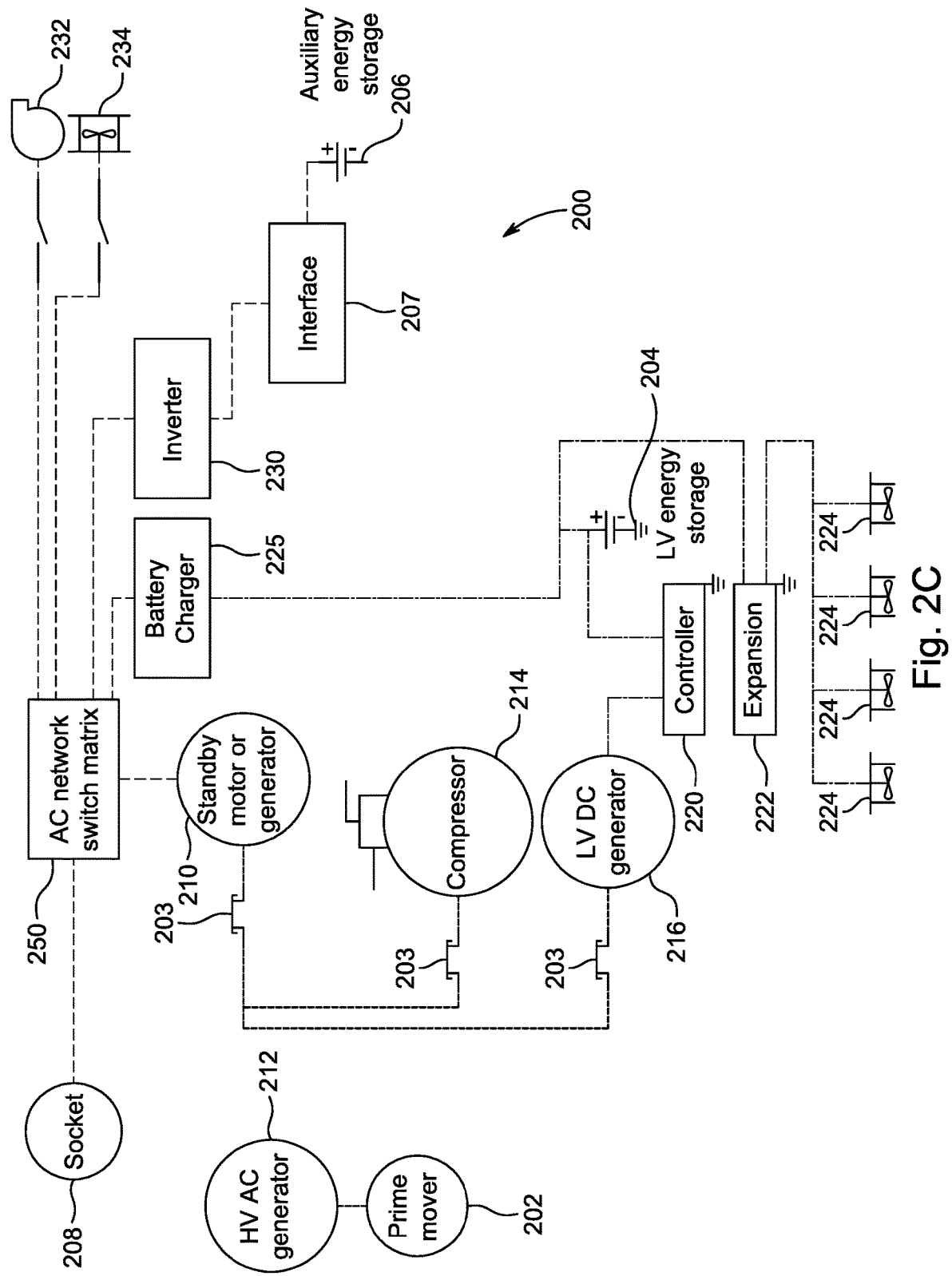

In some embodiments, when power is supplied by the transport power system 200 using a utility power source via the utility power socket 208 as shown in FIG. 2C, the controller 220 can instruct the compressor 214 to be powered by the standby motor or generator 210 acting as a standby motor, and the evaporator blower 232 and the condenser fans 234 to be powered by the utility power source via the utility power socket 208. In these embodiments, the AD/DC/DC converter 225 can use active rectification to charge the auxiliary energy storage 206 using excess power obtained by the utility power source via the utility power socket 208. As shown in FIG. 2C, the clutches 203 are controlled such that the prime mover 202 and the high voltage AC generator 212 are disconnected and do not provide power to the AC network switch matrix 250.

Figure 2D:
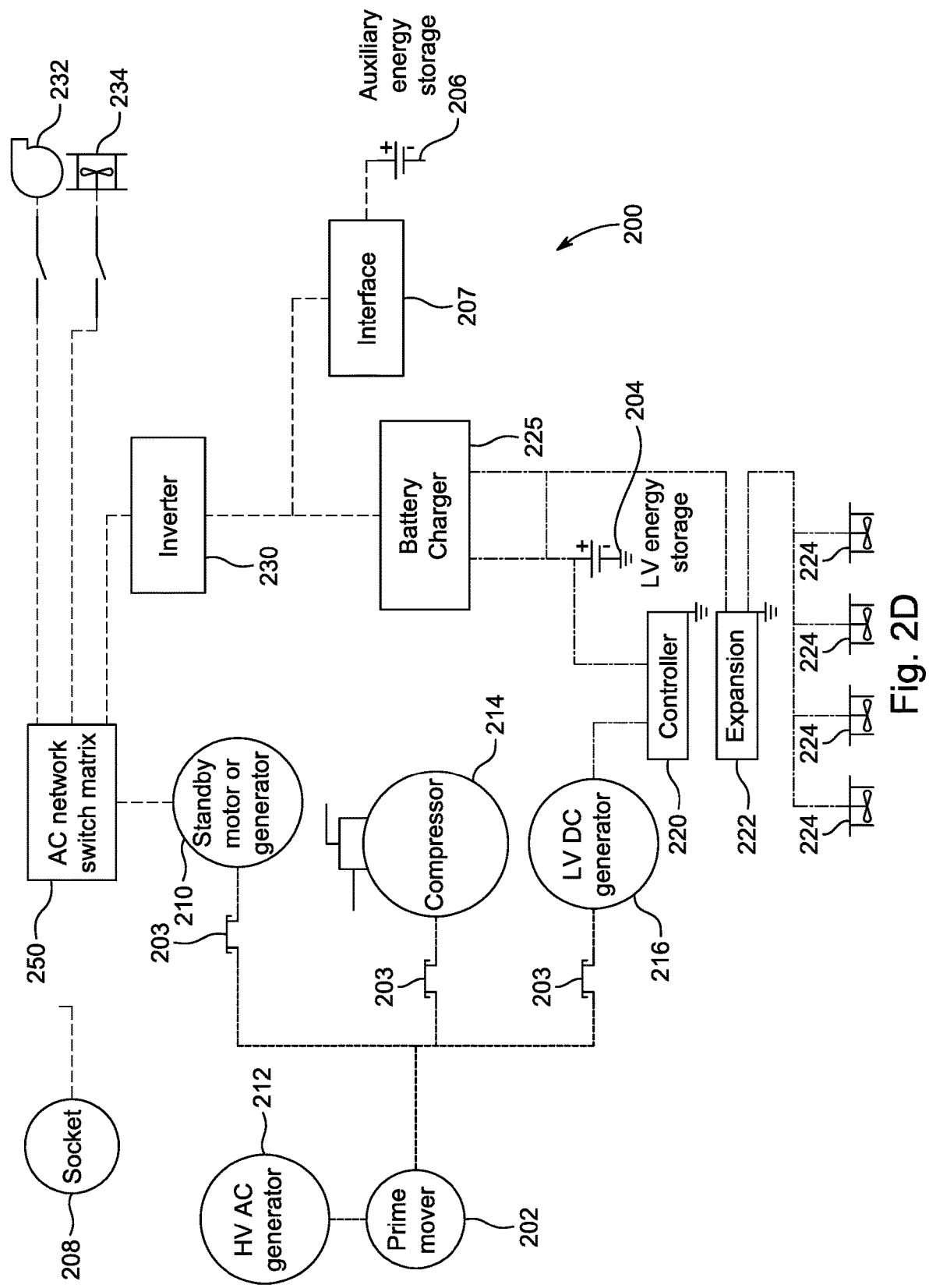

In some embodiments, when power is supplied by the transport power system 200 using the auxiliary energy storage 206 as shown in FIG. 2D, the controller 220 can instruct the compressor 214, the evaporator blower 232, and the condenser fans 234 to be powered by the auxiliary energy storage 206 via the inverter 230. In particular, the auxiliary energy storage 206 can provide power via the inverter 230 and the AC network switch matrix 250 to the standby motor or generator 210 acting as a standby motor to drive the compressor 214. As shown in FIG. 2D, the clutches 203 are controlled such that the prime mover 202 and the high voltage AC generator 212 are disconnected and do not provide power to the AC network switch matrix 250. Also, the utility power socket 208 can be disconnected from a utility power source such that the utility power socket 208 does not provide power to the AC network switch matrix 250.

The controller 220 can also be configured to control the transport climate control system. For example, in some embodiments, the controller 220 can be the TRS controller 15 shown in FIG. 1A, the TRS controller 83 shown in FIG. 1B, or the MTRS controller 170 shown in FIG. 1C. In these embodiments, the controller 220 is configured to control operation of the transport climate control system (the TRS 10, 75 and the MTRS 100) and the power system 200 to preserve autonomous operation of the transport climate control system.

The evaporator fan 232 is configured to provide conditioned air within an internal space of the transport unit. The condenser fans 234 are configured to blow air that provides a heat exchange with refrigerant of the refrigeration circuit out of the transport unit into the ambient. As shown in FIGS.

2A-D, the evaporator fan 232 and the condenser fans 234 are AC loads that require a high voltage AC power to operate. In some embodiments, the evaporator fan 232 and/or the condenser fans 234 can be variable speed fans. In other embodiments, the evaporator fan 232 and/or the condenser fans 234 can be two speed fans having a first non-zero speed and a second non-zero speed. In some embodiments, the evaporator fan 232 and/or the condenser fans 234 can be considered inductive loads. The remote evaporator unit fans 224 are configured to provide conditioned air within, for example, different zones of the internal space of the transport unit (e.g., a multi-zone transport unit). As shown in FIGS. 2A-D, the remote evaporator unit fans 224 are DC loads that require low voltage DC power to operate.

Figure 3:
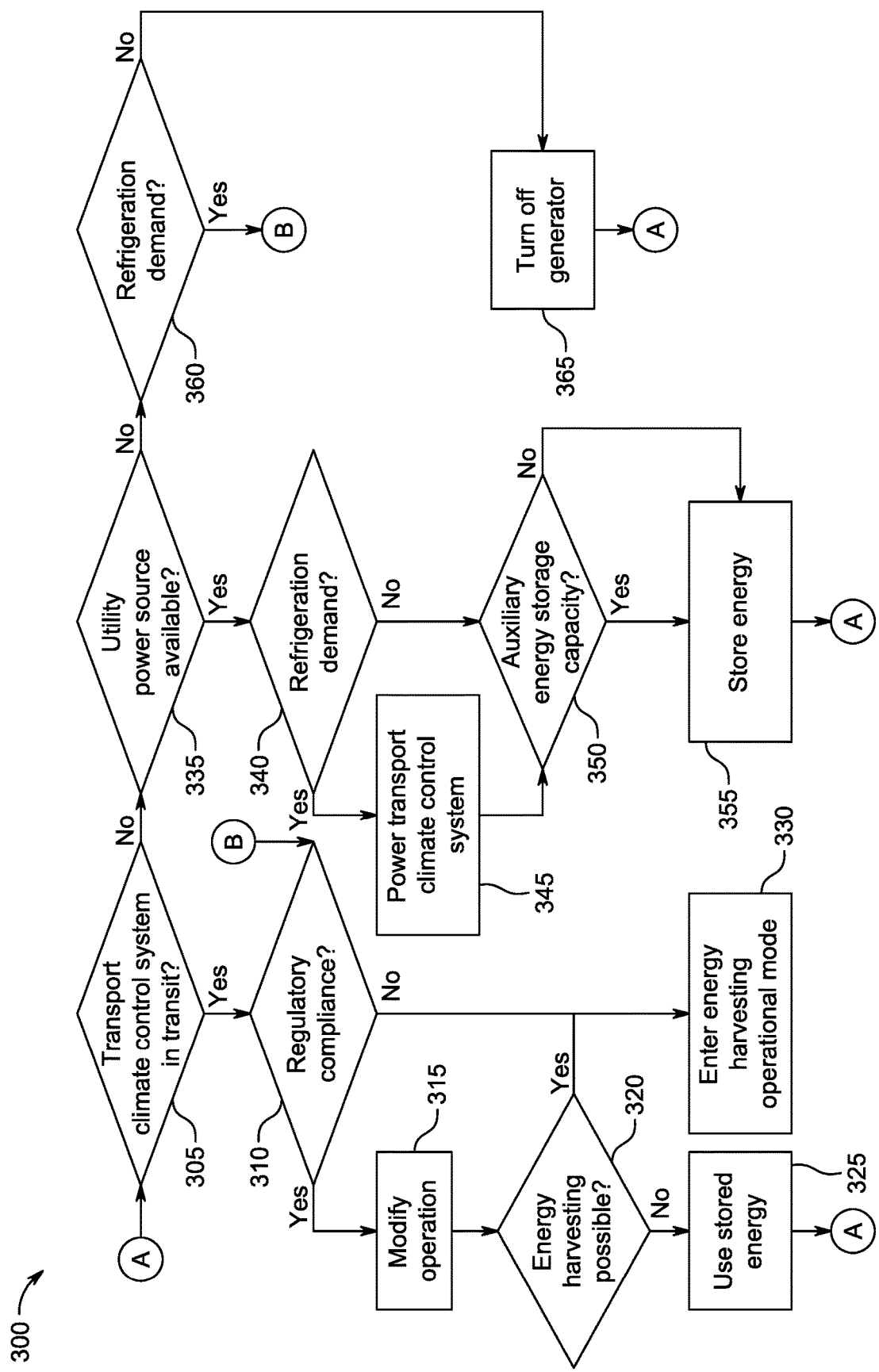
FIG. 3 illustrates a flowchart of a method for preserving autonomous operation of the transport climate control system, according to one embodiment.

FIG. 3 illustrates one embodiment of a flowchart of a method 300 for preserving autonomous operation of a transport climate control system (e.g., the TRS 10, the TRS 75, the MTRS 100) using the transport power system 200.

The method 300 begins at 305, whereby the controller 220 determines whether the transport climate control system is in transit. For example, the transport climate control system can be travelling along a predetermined route in order to deliver cargo stored in an internal space of the transport unit to one or more destinations. The transport climate control system can also be parked or stored at a transport yard, a warehouse, etc. for loading and/or unloading cargo within the transport unit. When the controller determines that the transport climate control system is in transit, the method 300 proceeds to 310. When the controller determines that the transport climate control system is not in transit, the method 300 proceeds to 335.

At 310, the controller 220 determines whether the transport climate control system is currently travelling or is parked in a region where there is currently a regulatory compliance restricting or preventing operation of the prime mover 202. In some embodiments, the controller 220 can obtain location data of the transport climate control system from a global positioning system (GPS) device provided in the transport unit. Regulations that may restrict or prevent operation of the prime mover can include noise emissions, fuel consumption regulations (e.g., brake-specific fuel consumption, diesel exhaust fluid, etc.), particulate regulations (e.g., particulate matter emissions, particulate number emissions, diesel particulate emissions, etc.), gaseous emissions (e.g., nitrogen oxide emissions, carbon dioxide emissions, hydro carbon emissions, etc.), etc. When the controller 220 determines that there is currently a regulatory compliance restricting or preventing operation of the prime mover 202, the method 300 proceeds to 315. When the controller 220 determines that the transport climate control system is currently travelling in a region where there is currently no regulatory compliance restricting or preventing operation of the prime mover 202, the method 300 proceeds to 330.

At 315, the controller 220 modifies operation of the transport power system 200 based on the regulatory compliance that is currently impacting operation of the transport climate control system and the transport power system 200. For example, when the regulatory compliance restricts or prevents operation of the prime mover 202, the controller 220 may instruct the transport power system 200 to not use the prime mover 202 or to restrict use of the prime mover 202 in order to comply with the regulatory compliance. This can include, for example, lowering a speed of the prime mover 202. The method 300 then proceeds to 320.

At 320, the controller 220 determines whether energy harvesting is possible based on the modified operation determined at 315. In some embodiments, the controller 220 can determine whether energy harvesting is possible based on the operation speed of the prime mover 202 and the amount of power used by the transport climate control system to meet a refrigeration demand amount. In some embodiments, the controller 220 can determine an amount of excess torque available from the prime mover 202 and calculate the amount of excess power available based on the determined amount of excess torque available. In some embodiments, the excess torque available from the prime mover 202 can be derived from, for example, a lookup table, field testing, etc. In some embodiments, the controller 220 can obtain the power drawn from the prime mover 202 and determine a total prime mover power available based on the speed of the prime mover 202. The controller 220 can then obtain the excess power available from the prime mover 202 by taking the difference of the power drawn from the prime mover 202 from the total prime mover power available. The controller 220 can then determine whether energy harvesting is possible based on whether the prime mover 202 has excess power available or whether the amount of excess power available from the prime mover 202 is greater than a predetermined goal threshold. When the controller 220 determines that energy harvesting is not possible, the method 300 proceeds to 325. When the controller 220 determines that energy harvesting is possible, the method 300 proceeds to 330.

At 325, the controller 220 instructs the auxiliary energy storage 206 to use stored energy to provide power to the transport climate control system alone or to supplement power provided by the prime mover 202 in order to meet the refrigeration demand from the transport climate control system while still ensuring that the prime mover 202 does complies with the regulatory compliance (see, for example, FIG. 2D). The amount of power provided by the auxiliary energy storage 206 can depend, for example, on the amount of power provided by the prime mover 202 and/or the refrigeration demand from the transport climate control system. The method 300 then proceeds to A and returns to 305.

At 330, the controller 220 operates the transport climate control system and the transport power system 200 to operate in the energy harvesting operation mode. In some embodiments, the controller 220 can prevent triggering of the energy harvesting mode when, for example, the transport climate control system is in a pull down stage to bring the internal space of the transport unit from an ambient temperature to the desired setpoint temperature. The energy harvesting operation mode is discussed in more detail with respect to FIG. 4.

At 335, when the controller 220 determines that the transport climate control system is not in transit, the controller determines whether a utility power source is available for powering the transport climate control system. For example, the controller 220 can determine whether the utility socket 208 is connected to a utility power source and is receiving power from the utility power source. When the controller 220 determines that a utility power source is available for powering the transport climate control system, the method 300 proceeds to 340. When the controller 220 determines that a utility power source is not available for powering the transport climate control system, the method 300 proceeds to 360.

At 340, the controller 220 determines whether the transport climate control system has a refrigeration demand. For example, the controller 220 can determine whether cooling is required within an internal space of the transport unit. When the controller 220 determines that there is a refrigeration demand, the method 300 proceeds to 345. When the controller determines that there is not a refrigeration demand, the method 300 proceeds to 350.

At 345, the controller 220 instructs the transport power system to power the transport climate control system using utility power provided from the utility socket 208. The method 300 then proceeds to 350.

At 350, the controller 220 determines whether the auxiliary energy storage 206 has capacity to store additional energy. In some embodiments, the controller 220 can communicate with the interface 207 to determine whether the auxiliary energy storage 206 has capacity to store additional energy. The controller 220 can determine that the auxiliary energy storage 206 has capacity to store additional energy when the state of charge of the auxiliary energy storage 206 is, for example, between about 20% and about 80%. When the controller 220 determines that the auxiliary energy storage 206 has capacity to store additional energy, the method 300 proceeds to 355. When the controller 220 determines that the auxiliary energy storage 206 does not have capacity to store additional energy, the method 300 proceeds to A and returns to 305.

At 355, the controller 220 instructs storage of power available from the utility power source into the auxiliary energy storage 206. When the utility power source is also powering the transport climate control system, the controller 220 can instruct the transport power system 200 to store any excess energy from the utility power source into the auxiliary energy storage 206 once a refrigeration demand amount from the transport climate control system is met. The method 300 then proceeds to A and returns to 305.

At 360, when the controller determines that the transport climate control system is not in transit and a utility power source is not available, the controller 220 determines whether the transport climate control system has a refrigeration demand. For example, the controller 220 can determine whether cooling is required within an internal space of the transport unit. When the controller 220 determines that there is a refrigeration demand, the method 300 proceeds to B and goes to 310. When the controller determines that there is not a refrigeration demand, the method 300 proceeds to 365.

At 365, the controller 220 instructs the transport power system (e.g., the prime mover 202, the standby motor or generator 210, the high voltage AC generator 212, etc.) to be turned off. Accordingly, energy of the transport power system 200 can be preserved. The method 300 then proceeds to A and returns to 305.

Figure 4:
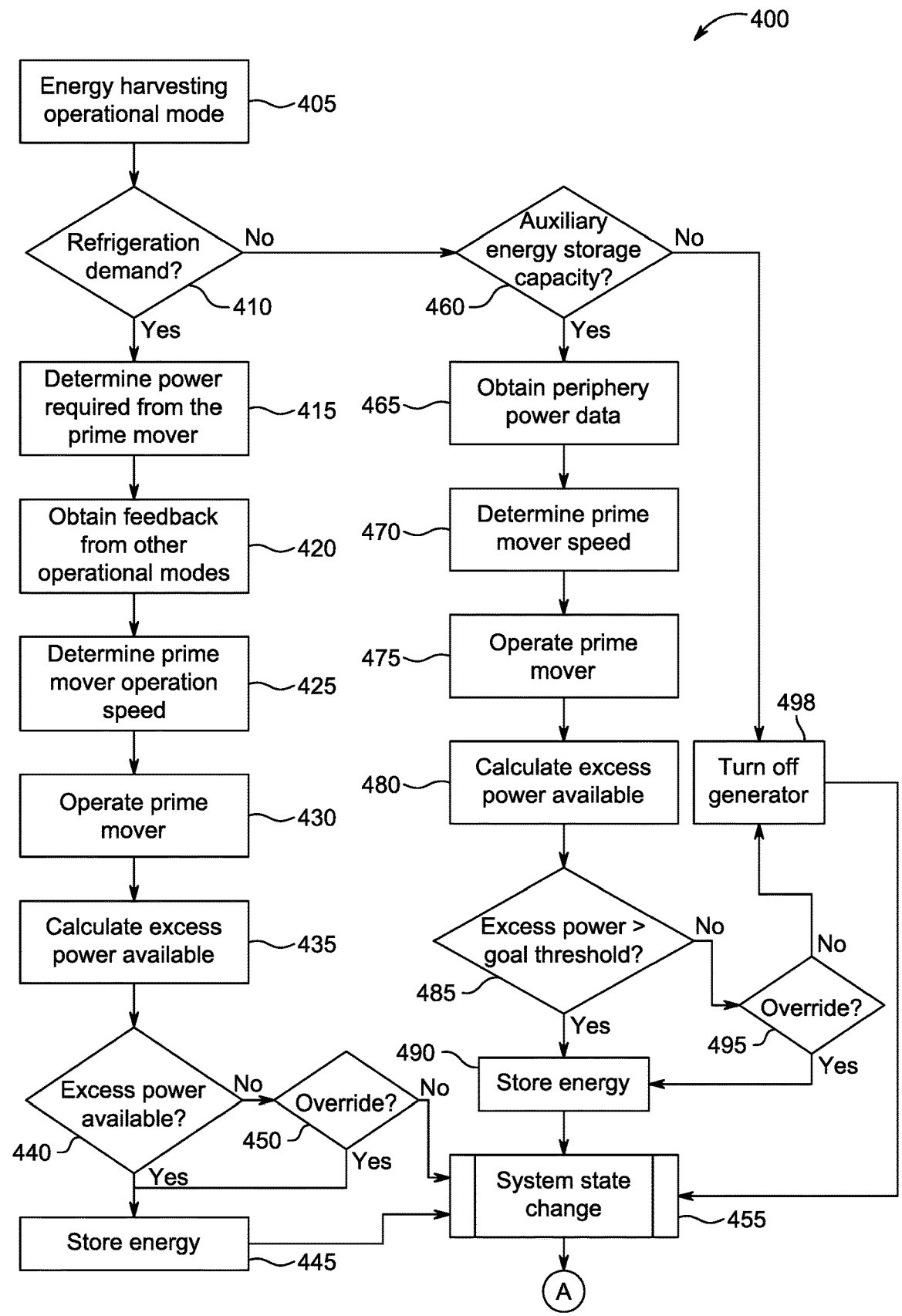
FIG. 4 illustrates a flowchart of a method for operating a transport climate control system in an energy harvesting operation mode using the transport power system shown in FIGS. 2A-D, according to one embodiment.

FIG. 4 illustrates one embodiment of a flowchart of a method 400 for operating a transport climate control system (e.g., the TRS 10, the TRS 75, the MTRS 100) in an energy harvesting operation mode using the transport power system 200. It will be appreciated that the energy harvesting operation mode can be performed in parallel with one or more other operation modes. The other operation modes can include, for example, the temperature control operation mode, the load loss prevention mode, the user feedback operation mode, the prime mover speed optimizer operation mode, the prime mover load optimizer operation mode, the COP optimization operation mode, the auxiliary energy storage maintenance operation mode, etc.

The method 400 starts at 405, whereby the controller 220 begins the energy harvesting operation mode. In some embodiments, the energy harvesting operation mode can be triggered when the controller 220 determines, for example, whenever the transport climate control system is being powered by the prime mover 202 whether or not the transport climate control system is in transit. In some embodiments, the controller 220 can prevent triggering of the energy harvesting mode when, for example, the transport climate control system is in a pull down stage to bring the internal space of the transport unit from an ambient temperature to the desired setpoint temperature. The method 400 then proceeds to 410.

At 410, the controller 220 determines whether the transport climate control system has a refrigeration demand. For example, the controller 220 can determine whether cooling is required within an internal space of the transport unit. When the controller 220 determines that there is a refrigeration demand, the method 400 proceeds to 415. When the controller determines that there is not a refrigeration demand, the method 400 proceeds to 455.

At 415, the controller 220 determines an amount of power required by the prime mover 202 to drive the compressor 214 and meet the refrigeration demand amount of the transport climate control system. In some embodiments, this includes the controller 220 determining a refrigeration demand amount to meet the refrigeration demand. The controller 220 can determine the refrigeration demand amount directly, for example, based on one or more temperatures (discharge refrigerant temperature, suction refrigerant temperature, evaporator refrigerant temperature, condenser refrigerant temperature, expansion device refrigerant temperature, etc.), one or more pressures (discharge refrigerant pressure, suction refrigerant pressure, evaporator refrigerant pressure, condenser refrigerant pressure, expansion device refrigerant pressure, etc.) at different locations along the refrigeration circuit, an electronic throttling valve (ETV) status, an electronic expansion valve (EEV) status, etc. The controller 220 can also determine the refrigeration demand amount indirectly from data received from an ECU of the prime mover 202 regarding the load on the prime mover 202. In some embodiments, the controller 220 can determine the amount of power required by the prime mover 202 to meet the refrigeration demand amount based on, for example, stored simulation data, load data (e.g., amount of power required by one or more of the compressor 214, the one or more evaporator blowers 232, the one or more condenser fans 234, etc.), etc. The method 400 then proceeds to 420.

At 420, the controller 220 retrieves feedback data from other operation modes of the transport power system 220. For example, the controller 220 can retrieve feedback data obtained while operating one or more other operation modes including, for example, the temperature control operation mode, the load loss prevention mode, the user feedback operation mode, the prime mover speed optimizer operation mode, the prime mover load optimizer operation mode, the COP optimization operation mode, the auxiliary energy storage maintenance operation mode, etc. In some embodiments, the feedback data can be obtained while operating the one or more other operation modes concurrently with the energy harvesting operation mode. The feedback data can include, for example, refrigeration demand amount, fuel consumption of the prime mover at the current prime mover operation speed, a compressor COP, amount of energy storage stored in the auxiliary energy storage 206, load optimization goals for the prime mover 202, etc. The method 400 then proceeds to 425. It will be appreciated that in some embodiments, 415 and 420 can be performed concurrently or 420 can be performed prior to 415.

At 425, the controller 220 determines a prime mover operation speed for the prime mover 202 based on the amount of power determined at 415 and the feedback data obtained at 420. In some embodiments, the controller 220 can use a stored operational map of the prime mover 202 to determine the prime mover operation speed based on the amount of power determined at 415 and the feedback data obtained at 420. In some embodiments, the prime mover operation speed can be an optimal operation speed that maximizes the coefficient of performance of the compressor 214. In some embodiments, the prime mover operation speed can be an optimal operation speed that optimizes efficient performance of the prime mover 202.

At 430, the controller 220 instructs the prime mover 202 to operate at the prime mover operation speed determined at 425. The method 400 then proceeds to 435.

At 435, the controller 220 calculates the amount of excess power available from the prime mover 202 based on the operation speed of the prime mover 202 and the amount of power used by the transport climate control system to meet the refrigeration demand amount. In some embodiments, the controller 220 can determine an amount of excess torque available from the prime mover 202 and calculate the amount of excess power available based on the determined amount of excess torque available. In some embodiments, the excess torque available from the prime mover 202 can be derived from, for example, a lookup table, load mapping curve information of the prime mover 202, field testing, etc. In some embodiments, the controller 220 can obtain the power drawn from the prime mover 202 and determine a total prime mover power available based on the speed of the prime mover 202. The controller 220 can then obtain the excess power available from the prime mover 202 by taking the difference of the power drawn from the prime mover 202 from the total prime mover power available.

In some embodiments, the controller 220 can determine that excess power is available from the prime mover 202 based on whether the prime mover speed is drooping beyond a predetermined desired amount. When the controller 220 determines that the prime mover speed is not drooping beyond the predetermined desired amount, the controller 220 can determine that the prime mover has excess power available that can be used, for example, for storing energy in the auxiliary energy storage 206. The predetermined desired amount at a particular prime mover speed can be based on, for example, simulation data, load mapping curve data, etc. The controller 220 can monitor the prime mover speed and whether the prime mover is speed is drooping based on, for example, information received from an ECU of the prime mover 202.

In some embodiments, the controller 220 can determine that excess power is available from the prime mover 202 based on whether the injected fuel quantity being delivered to the prime mover 202 is less than a maximum allowable injected fuel quantity. When the controller determines that the injected fuel quantity being delivered to the prime mover 202 is less than a maximum allowable injected fuel quantity, the controller 220 can determine that the prime mover has excess power available that can be used, for example, for storing energy in the auxiliary energy storage 206. The controller 220 can monitor the amount of injected fuel being delivered to the prime mover 202 based on, for example, information received from an ECU of the prime mover 202.

In some embodiments, the controller 220 can determine the amount of excess power available based on a load percentage on the prime mover 202. When the controller 220 determines that the load percentage on the prime mover 202 is over, for example, 80%, the controller 220 can determine that the prime mover 202 is currently being overloaded and can determine that the speed of the prime mover 202 should be increased. If the prime mover 202 is operating at a maximum speed, the controller 220 can instead back off on storing excess power into the auxiliary energy storage 206. When the controller 220 determines that the load percentage on the prime mover 202 is between, for example, 60% and 80%, the controller 220 can determine that the prime mover 202 is operating at a near optimal speed and can determine that the load on the prime mover 202 should be maintained or incremented slowly (e.g., increment load by 1 kW). The increase in the load on the prime mover 202 can be directed to additional charging of the auxiliary energy storage 206. When the controller 220 determines that the load percentage on the prime mover 202 is less than, for example, 60%, the controller 220 can determine that the prime mover 202 is currently being underloaded and can determine that the load on the prime mover 202 can be increased (e.g., increment load by 3 kW) to optimize load efficiency. The increase in the load on the prime mover 202 can be directed to additional charging of the auxiliary energy storage 206. The method 400 then proceeds to 440.

At 440, the controller 220 determines whether excess power is available from the prime mover 202 based on the calculation at 435. When the controller 220 determines that excess power is available from the prime mover 202, the method 400 proceeds to 445. When the controller 220 determines that excess power is not available from the prime mover 202, the method 400 proceeds to 450.

At 445, the controller 220 instructs storage of power available from the prime mover 202. In some embodiments, this can include the controller 220 instructing at least one of the standby motor or generator 210 and the high voltage AC generator 212 to harvest excess torque available from the prime mover 202. Once refrigeration demand amount from the transport climate control system is met, the controller 220 can instruct the standby motor or generator 210 and/or the high voltage AC generator 212 to store any excess energy into the auxiliary energy storage 206. It will be appreciated, that operating the prime mover at 430 can be done concurrently with calculating the excess power available 435 and potentially storing the energy at 445 when excess power is available or there is a reason to store energy in the auxiliary energy storage 206. The method 400 then proceeds to 455.

At 450, the controller 220 determines whether there may be a reason to store energy in the auxiliary energy storage 206 even though excess power may not be available (i.e., override the decision made at 440). For example, the controller 220 can determine that there may be a reason to store energy in the auxiliary energy storage 206 when the transport climate control system is approaching a location (e.g., via predetermined route data stored in the controller 220, etc.) that may have a regulation preventing the transport power system from being able to use the prime mover 202. In another example, the controller 220 can determine that there may be a reason to store energy in the auxiliary energy storage 206 when the state of charge of the auxiliary energy storage 206 is, for example, less than 20%.

It will be appreciated that when the controller 220 determines that there is a reason to store energy in the auxiliary energy storage 206, the controller 220 may instruct a speed increase of the prime mover 202 which may result in noncompliance of the regulation or may instruct the transport climate control system to reduce power consumption by modifying operation of one or more loads of the transport climate control system (e.g., the evaporator fan(s) 232), the condenser fan(s) 234, the compressor 214, the remote evaporator unit fan(s) 224, etc.).

When the controller 220 determines that there is a reason to store energy in the auxiliary energy storage 206, the method 400 proceeds to 445. When the controller 220 determines that there is not a reason to store energy in the auxiliary energy storage 206, the method 400 proceeds to 450.

At 455, the controller 220 waits a predetermined amount of time (e.g., between one and 10 minutes) or determines whether a change in state of the transport climate control system and/or the transport power system 200 has occurred before returning the method 400 back to 405. In some embodiments, a change of state can be when, for example, the transport climate control system is no longer in transit, the transport climate control system is approaching a location with a regulatory compliance that may impact usage of the prime mover 202, there is a change in the refrigeration demand of the transport climate control system, there is a change in the charge rate of the auxiliary energy storage 206, etc. The method 400 then proceeds to A and returns to FIG. 3.

At 460, once the controller 220 determines that the transport climate control system does not have a refrigeration demand at 410, the controller 220 determines whether the auxiliary energy storage 206 has capacity to store additional energy. In some embodiments, the controller 220 can communicate with the interface 207 to determine whether the auxiliary energy storage 206 has capacity to store additional energy. The controller 220 can determine that the auxiliary energy storage 206 has capacity to store additional energy when the state of charge of the auxiliary energy storage 206 is, for example, less than about 80%. When the controller 220 determines that the auxiliary energy storage 206 has capacity to store additional energy, the method 400 proceeds to 465. When the controller 220 determines that the auxiliary energy storage 206 does not have capacity to store additional energy, the method 400 proceeds to 498.

At 465, the controller 220 obtains periphery power data. The periphery power data can include, for example, fuel consumption by the prime mover 202 at the current prime mover operation speed, a charge rate of the auxiliary energy storage 206, etc. In some embodiments, the periphery power data can be obtained via a lookup table, a load mapping curve of the prime mover 202, simulation data, etc. The method 400 then proceeds to 470.

At 470, the controller 220 determines a prime mover operation speed for the prime mover 202 based on periphery power data obtained at 465. In some embodiments, the controller 220 can use a stored operational map of the prime mover 202 to determine the prime mover operation speed based on the periphery power data obtained at 465. In some embodiments, the prime mover operation speed can be an optimal operation speed that maximizes, for example, the efficiency of charging the auxiliary energy storage 206. In some embodiments, the prime mover operation speed can be an optimal operation speed that optimizes efficient performance of the prime mover 202.

At 475, the controller 220 instructs the prime mover 202 to operate at the prime mover operation speed determined at 470. The method 400 then proceeds to 480.

At 480, the controller 220 calculates the amount of excess power available from the prime mover 202 based on the operation speed of the prime mover 202. In some embodiments, the controller 220 can determine an amount of excess torque available from the prime mover 202 and calculate the amount of excess power available based on the determined amount of excess torque available. In some embodiments, the excess torque available from the prime mover 202 can be derived from, for example, a lookup table, field testing, etc. In some embodiments, the controller 220 can obtain the power drawn from the prime mover 202 and determine a total prime mover power available based on the speed of the prime mover 202. The controller 220 can then obtain the excess power available from the prime mover 202 by taking the difference of the power drawn from the prime mover 202 from the total prime mover power available.

In some embodiments, the controller 220 can determine the amount of excess power available based on a load percentage on the prime mover 202. When the controller 220 determines that the load percentage on the prime mover 202 is over, for example, 80%, the controller 220 can determine that the prime mover 202 is currently being overloaded and can determine that the speed of the prime mover 202 should be increased. If the prime mover 202 is operating at a maximum speed, the controller 220 can instead back off on storing excess power into the auxiliary energy storage 206. When the controller 220 determines that the load percentage on the prime mover 202 is between, for example, 60% and 80%, the controller 220 can determine that the prime mover 202 is operating at a near optimal speed and can determine that the load on the prime mover 202 should be maintained or incremented slowly (e.g., increment load by 1 kW). The increase in the load on the prime mover 202 can be directed to additional charging of the auxiliary energy storage 206. When the controller 220 determines that the load percentage on the prime mover 202 is less than, for example, 60%, the controller 220 can determine that the prime mover 202 is currently being underloaded and can determine that the load on the prime mover 202 can be increased (e.g., increment load by 3 kW) to optimize load efficiency. The increase in the load on the prime mover 202 can be directed to additional charging of the auxiliary energy storage 206. The method 400 then proceeds to 485.

At 485, the controller 220 determines whether excess power available from the prime mover 202 is greater than a goal threshold. In some embodiments, the goal threshold can be a minimum amount of power that can be generated to justify charging the auxiliary energy storage 206 with the prime mover 202. The goal threshold can be based on, for example, trip parameters. In some embodiments, the power system 200 can mandate storing the excess power available from the prime mover 202 into the auxiliary energy storage 206 when the charge level of the auxiliary energy storage 206 is less than ~20%, prioritize storing the excess power available from the prime mover 202 into the auxiliary energy storage 206 when the charge level of the auxiliary energy storage 206 is between ~20-40%, and lower the priority of storing the excess power available from the prime mover 202 into the auxiliary energy storage 206 when the charge level of the auxiliary energy storage is greater than ~70%. When the controller 220 determines that the excess power available from the prime mover 202 is greater than the goal threshold, the method 400 proceeds to 490. When the controller 220 determines that the excess power available from the prime mover 202 is not greater than the goal threshold, the method 400 proceeds to 495.

At 490, the controller 220 instructs storage of power available from the prime mover 202. In some embodiments, this can include the controller 220 instructing at least one of the standby motor or generator 210 and the high voltage AC generator 212 to harvest excess torque available from the prime mover 202. The controller 220 can instruct the standby motor or generator 210 and/or the high voltage AC generator 212 to store energy into the auxiliary energy storage 206. It will be appreciated, that operating the prime mover at 475 can be done concurrently with calculating the excess power available 480 and potentially storing the energy at 490 when excess power is available or there is a reason to store energy in the auxiliary energy storage 206. The method 400 then proceeds to 455.

At 495, the controller 220 determines whether there may be a reason to store energy in the auxiliary energy storage 206 even though the excess power available from the prime mover 202 is not greater than the goal threshold (i.e., override the decision made at 485). For example, the controller 220 can determine that there may be a reason to store energy in the auxiliary energy storage 206 when the transport climate control system is approaching a location (e.g., via predetermined route data stored in the controller 220, etc.) that may have a regulation preventing the transport power system from being able to use the prime mover 202. In another example, the controller 220 can determine that there may be a reason to store energy in the auxiliary energy storage 206 when the state of charge of the auxiliary energy storage 206 is, for example, less than 20%.

It will be appreciated that when the controller 220 determines that there is a reason to store energy in the auxiliary energy storage 206, the controller 220 may instruct a speed increase of the prime mover 202 which may result in noncompliance of the regulation or may instruct the transport climate control system to reduce power consumption by modifying operation of one or more loads of the transport climate control system (e.g., the evaporator fan(s) 232), the condenser fan(s) 234, the compressor 214, the remote evaporator unit fan(s) 224, etc.).

When the controller 220 determines that there is a reason to store energy in the auxiliary energy storage 206, the method 400 proceeds to 490. When the controller 220 determines that there is not a reason to store energy in the auxiliary energy storage 206, the method 400 proceeds to 498.

At 498, the controller 220 instructs the transport power system 200 (e.g., the prime mover 202, the standby motor or generator 210, the high voltage AC generator 212, etc.) to be turned off. Accordingly, energy of the transport power system 200 can be preserved. The method 400 then proceeds to 455.

Accordingly, the method 400 can ensure autonomous operation of the transport climate control system. That is, the transport power system 200 and the transport climate control system can maximize opportunities while in transit to harvest any excess power generated by the prime mover 202, provide efficient power management for powering the transport climate control system, manage multiple operation modes of the transport climate control system and then utilize the excess power stored in the auxiliary energy storage 206 when necessary to ensure that the transport unit with the transport climate control system does not have to make a stop to connect to a utility power source. That is, powering the transport power system 200 and the transport climate control system using the utility power source is a last priority as doing so results in autonomous operation of the transport climate control system becoming lost. The method 400 attempts to power the transport power system 200 and the transport climate control system without using the utility power source and only looks to use the utility power source when there are no other options available.

Aspects:

It is to be appreciated that any of aspects 1-8 can be combined with any of aspects 9-17.

Aspect 1. A method for preserving autonomous operation of a transport climate control system that includes a refrigeration circuit having a compressor, the refrigeration circuit providing climate control within an internal space of a transport unit using a transport power system that includes a controller, a prime mover, and an auxiliary energy storage, the method comprising:

the controller determining whether a regulatory compliance at a current location is restricting and/or preventing the use of the prime mover for powering the transport climate control system while the transport unit is in transit;

when the controller determines that use of the prime mover for powering the transport climate control system is not being restricted or prevented because of a regulatory compliance, operating the transport climate control system and the transport power system in an energy harvesting operation mode for storing excess power generated by the prime mover into the auxiliary energy storage; and when the controller determines that use of the prime mover for powering the transport climate control system is being restricted or prevented because of a regulatory compliance, the controller instructing the auxiliary energy storage to provide power to the transport climate control system.

Aspect 2. The method of aspect 1, wherein operating the energy harvesting operation mode includes:

the controller determining an amount of power required from the prime mover, the controller obtaining feedback data regarding operational modes of the transport climate control system when the transport climate control system has a refrigeration demand, the controller determining a prime mover operation speed based on the power required from the prime mover and the feedback data, the prime mover operating at the determined prime mover operation speed, the controller calculating the amount of excess power available from the prime mover, and storing the excess power in the auxiliary energy storage.

Aspect 3. The method of aspect 2, wherein the feedback data includes at least one of a refrigeration demand amount, a fuel consumption of the prime mover at the current prime mover operation speed, a compressor coefficient of performance, and an amount of energy storage stored in the auxiliary energy storage.

Aspect 4. The method of any one of aspects 2 and 3, further comprising the controller determining the prime mover operation speed based on the power required from the prime mover and the feedback data using a stored operational map of the prime mover.

Aspect 5. The method of any one of aspects 1-4, wherein operating the energy harvesting operation mode includes:

the controller obtaining periphery power data regarding the transport power system when the transport climate control system does not have a refrigeration demand, the controller determining the prime mover operation speed based on the periphery power data, the prime mover operating at the determined prime mover operation speed, the controller calculating the amount of excess power available from the prime mover, and storing the excess power in the auxiliary energy storage.

Aspect 6. The method of aspect 5, wherein operating the energy harvesting operation mode further includes:

the controller determining whether the amount of excess power available from the prime mover is greater than a goal threshold, storing the excess power in the auxiliary energy storage when the amount of excess power is determined to be greater than the goal threshold, and turning off a generator of the transport power system driven by the prime mover when the amount of excess power is determined to not be greater than the goal threshold.

Aspect 7. The method of any one of aspects 5 and 6, wherein the periphery power data includes at least one of a fuel consumption by the prime mover at the current prime mover operation speed and a charge rate of the auxiliary energy storage.

Aspect 8. The method of any one of aspects 1-7, further comprising operating one or more of a temperature control operation mode, a load loss prevention mode, a user feedback operation mode, a prime mover speed optimizer operation mode, a prime mover load optimizer operation mode, a coefficient of performance optimization operation mode, an auxiliary energy storage maintenance operation mode concurrently with the energy harvesting operation mode.

Aspect 9. A transport power system, the system comprising:

a controller that controls operation of the transport power system and a transport climate control system, the transport climate control system having a refrigeration circuit that provides climate control within an internal space of a transport unit, the refrigeration circuit including a compressor;

a prime mover that provides power to the transport climate control system; and an auxiliary energy storage that provides power to the transport climate control system, wherein the controller determines whether a regulatory compliance at a current location is restricting and/or preventing the use of the prime mover for powering the transport climate control system while the transport unit is in transit, wherein when the controller determines that use of the prime mover for powering the transport climate control system is not being restricted or prevented because of a regulatory compliance, the controller instructs the transport climate control system and the transport power system to operate in an energy harvesting operation mode for storing excess power generated by the prime mover into the auxiliary energy storage, and wherein when the controller determines that use of the prime mover for powering the transport climate control system is being restricted or prevented because of a regulatory compliance, the controller instructs the auxiliary energy storage to provide power to the transport climate control system.

Aspect 10. The transport power system of aspect 9, wherein when the controller instructs the transport climate control system and the transport power system to operate in the energy harvesting operation mode:

the controller determines an amount of power required from the prime mover, the controller obtains feedback data regarding operational modes of the transport climate control system when the transport climate control system has a refrigeration demand, the controller determines a prime mover operation speed based on the power required from the prime mover and the feedback data, the prime mover operates at the determined prime mover operation speed, the controller calculates the amount of excess power available from the prime mover, and the excess power is stored in the auxiliary energy storage.

Aspect 11. The transport power system of aspect 10, wherein the feedback data includes at least one of a refrigeration demand amount, a fuel consumption of the prime mover at the current prime mover operation speed, a compressor coefficient of performance, and an amount of energy storage stored in the auxiliary energy storage.

Aspect 12. The transport power system of any one of aspects 10 and 11, wherein the controller determines the prime mover operation speed based on the power required from the prime mover and the feedback data using a stored operational map of the prime mover.

Aspect 13. The transport power system of any one of aspects 9-12, wherein when the controller is configured to instruct the transport climate control system and the transport power system to operate in the energy harvesting operation mode:

the controller obtains periphery power data regarding the transport power system when the transport climate control system does not have a refrigeration demand, the controller determines the prime mover operation speed based on the periphery power data, the prime mover operates at the determined prime mover operation speed, the controller calculates the amount of excess power available from the prime mover, and the excess power is stored in the auxiliary energy storage.

Aspect 14. The transport power system of aspect 13, wherein when the controller instructs the transport climate control system and the transport power system to operate in the energy harvesting operation mode:

the controller determines whether the amount of excess power available from the prime mover is greater than a goal threshold, the excess power is stored in the auxiliary energy storage when the amount of excess power is determined to be greater than the goal threshold, and a generator of the transport power system driven by the prime mover is turned off when the amount of excess power is determined to not be greater than the goal threshold.

Aspect 15. The transport power system of any one of aspects 13 and 14, wherein the periphery power data includes at least one of a fuel consumption by the prime mover at the current prime mover operation speed and a charge rate of the auxiliary energy storage.

Aspect 16. The transport power system of any one of aspects 9-15, wherein the auxiliary energy storage is a high voltage battery system that has a maximum working voltage between 60V DC and 1500 V DC.

Aspect 17. The transport power system of aspect 9, wherein the controller instructs one or more of a temperature control operation mode, a load loss prevention mode, a user feedback operation mode, a prime mover speed optimizer operation mode, a prime mover load optimizer operation mode, a coefficient of performance optimization operation mode, an auxiliary energy storage maintenance operation mode concurrently with the energy harvesting operation mode.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, indicate the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts, without departing from the scope of the present disclosure. The word "embodiment" as used within this specification may, but does not necessarily, refer to the same embodiment. This specification and the embodiments described are examples only. Other and further embodiments may be devised without departing from the basic scope thereof, with the true scope and spirit of the disclosure being indicated by the claims that follow.

What is claimed is:

1. A method for preserving autonomous operation of a transport climate control system that includes a refrigeration circuit having a compressor, the refrigeration circuit providing climate control within an internal space of a transport unit using a transport power system that includes a controller, a prime mover configured to operate at a plurality of non-zero speeds, and an auxiliary energy storage, the method comprising:

the controller determining whether a regulatory compliance at a current location is restricting and/or preventing the use of the prime mover for powering the transport climate control system while the transport unit is in transit;

when the controller determines that use of the prime mover for powering the transport climate control system is not being restricted or prevented because of a regulatory compliance, operating the transport climate control system and the transport power system in an energy harvesting operation mode for storing excess power generated by the prime mover into the auxiliary energy storage, wherein operating the energy harvesting operation mode includes:

the controller determining an amount of power required from the prime mover to drive the compressor and meet a refrigeration demand of the transport climate control system, the controller obtaining feedback data regarding operational modes of the transport climate control system, wherein the feedback data includes at least one of a refrigeration demand amount, a fuel consumption of the prime mover at the current prime mover operation speed, a compressor coefficient of performance, and an amount of energy storage stored in the auxiliary energy storage, the controller determining a prime mover operation speed from the plurality of non-zero prime mover operation speeds based on the feedback data and the power required from the prime mover to drive the compressor and meet the refrigeration demand of the transport climate control system, the controller calculating the amount of excess power available from the prime mover, and storing the excess power in the auxiliary energy storage; and when the controller determines that use of the prime mover for powering the transport climate control system is being restricted or prevented because of a regulatory compliance, the controller instructing the auxiliary energy storage to provide power to the transport climate control system.

2. The method of claim 1, further comprising the controller determining the prime mover operation speed from the plurality of non-zero prime mover operation speeds based on the power required from the prime mover and the feedback data using a stored operational map of the prime mover.

3. The method of claim 1, wherein operating the energy harvesting operation mode includes:

the controller obtaining periphery power data regarding the transport power system when the transport climate control system does not have a refrigeration demand, the controller determining the prime mover operation speed from the plurality of non-zero prime mover operation speeds based on the periphery power data, the controller calculating the amount of excess power available from the prime mover, and storing the excess power in the auxiliary energy storage.

4. The method of claim 3, wherein operating the energy harvesting operation mode further includes:

the controller determining whether the amount of excess power available from the prime mover is greater than a goal threshold, wherein the goal threshold is at least one of a mechanical power goal threshold and an electrical power goal threshold, storing the excess power in the auxiliary energy storage when the amount of excess power is determined to be greater than the goal threshold, and turning off a generator of the transport power system driven by the prime mover when the amount of excess power is determined to not be greater than the goal threshold.

5. The method of claim 3, wherein the periphery power data includes at least one of a fuel consumption by the prime mover at the current prime mover operation speed and a charge rate of the auxiliary energy storage.

6. The method of claim 1, further comprising operating one or more of a temperature control operation mode, a load loss prevention mode, a user feedback operation mode, a prime mover speed optimizer operation mode, a prime mover load optimizer operation mode, a coefficient of performance optimization operation mode, an auxiliary energy storage maintenance operation mode concurrently with the energy harvesting operation mode.

7. The method of claim 1, further comprising that when operating in the energy harvesting operation mode and the controller determining there is no excess power available from the prime mover to store in the auxiliary energy storage, the method further includes:

the controller determining that storing energy in the auxiliary energy storage is required, and the controller instructing at least one of a speed increase of the prime mover, and a power consumption reduction of the transport climate control system.

8. The method of claim 1, wherein the controller calculates the amount of excess power available from the prime mover based on the prime mover operation speed and an amount of power used by the transport climate control system to meet the refrigeration demand amount.

9. A transport power system, the system comprising:

a controller that controls operation of the transport power system and a transport climate control system, the transport climate control system having a refrigeration circuit that provides climate control within an internal space of a transport unit, the refrigeration circuit including a compressor;

a prime mover configured to operate at a plurality of non-zero speeds that provides power to the transport climate control system; and an auxiliary energy storage that provides power to the transport climate control system, wherein the controller determines whether a regulatory compliance at a current location is restricting and/or preventing the use of the prime mover for powering the transport climate control system while the transport unit is in transit, wherein when the controller determines that use of the prime mover for powering the transport climate control system is not being restricted or prevented because of a regulatory compliance, the controller instructs the transport climate control system and the transport power system to operate in an energy harvesting operation mode for storing excess power generated by the prime mover into the auxiliary energy storage, wherein when the controller instructs the transport climate control system and the transport power system to operate in the energy harvesting operation mode:

the controller determines an amount of power required from the prime mover to drive the compressor and meet a refrigeration demand of the transport climate control system, the controller obtains feedback data regarding operational modes of the transport climate control system, wherein the feedback data includes at least one of a refrigeration demand amount, a fuel consumption of the prime mover at the current prime mover operation speed, a compressor coefficient of performance, and an amount of energy storage stored in the auxiliary energy storage, the controller determines a prime mover operation speed from the plurality of non-zero prime mover operation speeds based on the feedback data and the power required from the prime mover to drive the compressor and meet a refrigeration demand of the transport climate control system, the controller calculates the amount of excess power available from the prime mover, and the excess power is stored in the auxiliary energy storage, and wherein when the controller determines that use of the prime mover for powering the transport climate control system is being restricted or prevented because of a regulatory compliance, the controller instructs the auxiliary energy storage to provide power to the transport climate control system.

10. The transport power system of claim 9, wherein the controller determines the prime mover operation speed from the plurality of non-zero prime mover operation speeds based on the power required from the prime mover and the feedback data using a stored operational map of the prime mover.

11. The transport power system of claim 9, wherein when the controller is configured to instruct the transport climate control system and the transport power system to operate in the energy harvesting operation mode:

the controller obtains periphery power data regarding the transport power system when the transport climate control system does not have a refrigeration demand, the controller determines the prime mover operation speed from the plurality of non-zero prime mover operation speeds based on the periphery power data, the controller calculates the amount of excess power available from the prime mover, and the excess power is stored in the auxiliary energy storage.

12. The transport power system of claim 11, wherein when the controller instructs the transport climate control system and the transport power system to operate in the energy harvesting operation mode:

the controller determines whether the amount of excess power available from the prime mover is greater than a goal threshold, wherein the goal threshold is at least one of a mechanical power goal threshold and an electrical power goal threshold, the excess power is stored in the auxiliary energy storage when the amount of excess power is determined to be greater than the goal threshold, and a generator of the transport power system driven by the prime mover is turned off when the amount of excess power is determined to not be greater than the goal threshold.

13. The transport power system of claim 11, wherein the periphery power data includes at least one of a fuel consumption by the prime mover at the current prime mover operation speed and a charge rate of the auxiliary energy storage.

14. The transport power system of claim 9, wherein the auxiliary energy storage is a high voltage battery system that has a maximum working voltage between 60V DC and 1500 V DC.

15. The transport power system of claim 9, wherein the controller instructs one or more of a temperature control operation mode, a load loss prevention mode, a user feedback operation mode, a prime mover speed optimizer operation mode, a prime mover load optimizer operation mode, a coefficient of performance optimization operation mode, an auxiliary energy storage maintenance operation mode concurrently with the energy harvesting operation mode.

16. The transport power system of claim 9, wherein when the transport climate control system and the transport power system are operating in the energy harvesting operation mode and the controller determines there is no excess power available from the prime mover to store in the auxiliary energy storage, the controller is configured to determine:

that storing energy in the auxiliary energy storage is required, and instruct at least one of a speed increase of the prime mover, and a power consumption reduction of the transport climate control system.

17. The transport power system of claim 9, wherein the controller calculates the amount of excess power available from the prime mover based on the prime mover operation speed and an amount of power used by the transport climate control system to meet the refrigeration demand amount.

* * * * *